(12) United States Patent
Oba et al.

(10) Patent No.: US 7,957,866 B2
(45) Date of Patent: Jun. 7, 2011

(54) TRAVEL CONTROL APPARATUS FOR A VEHICLE

(75) Inventors: Takaaki Oba, Saitama (JP); Shunichi Nakazawa, Saitama (JP); Futoshi Kobayashi, Saitama (JP); Yukio Yoshida, Saitama (JP); Motoaki Suda, Saitama (JP)

(73) Assignee: Kabushiki Kaisha Aichi Corporation (JP)

( * ) Notice: Subject to any disclaimer, the term of this patent is extended or adjusted under 35 U.S.C. 154(b) by 0 days.

(21) Appl. No.: 10/590,903

(22) PCT Filed: May 31, 2006

(86) PCT No.: PCT/JP2006/311365
§ 371 (c)(1),
(2), (4) Date: Feb. 12, 2007

(87) PCT Pub. No.: WO2006/129862
PCT Pub. Date: Dec. 7, 2006

(65) Prior Publication Data
US 2008/0097666 A1      Apr. 24, 2008

(30) Foreign Application Priority Data

May 31, 2005 (JP) ................................. 2005-158737
May 31, 2005 (JP) ................................. 2005-158738
Aug. 2, 2005 (JP) ................................. 2005-223863

(51) Int. Cl.
*A01B 69/00* (2006.01)
(52) U.S. Cl. ............... 701/41; 701/19; 701/37; 701/96; 701/301; 180/412; 180/446; 280/5.5

(58) Field of Classification Search ................ 701/1, 42, 701/19, 37, 96, 301; 340/933; 280/5.5; 180/412, 180/446
See application file for complete search history.

(56) References Cited

U.S. PATENT DOCUMENTS 5,729,107 A * 3/1998 Shimizu et al. ............... 318/489

FOREIGN PATENT DOCUMENTS

DE        10163330 A1    7/2002

(Continued)

OTHER PUBLICATIONS

International Search Report for PCT/JP2006/311365; dated Aug. 9, 2006.

(Continued)

*Primary Examiner* — Mark Hellner
*Assistant Examiner* — Redhwan Mawari
(74) *Attorney, Agent, or Firm* — Studebaker & Brackett PC; Donald R. Studebaker

(57) ABSTRACT

In a configuration in which a control is performed for actuating the steering cylinder 17 so that the steering angle of the front wheel 11a (steering wheel), which is detected by the steering angle detector 62, becomes a target steering angle which is set in accordance with an operational state of the steering dial 42, the target steering angle of the front wheel 11a (steering wheel), which is set in accordance with an operational state of the steering dial 42, is compared with a detected steering angle of the front wheel 11a, which is detected by the steering detector 62, and when the difference between the target steering angle and the detected steering angle is a predetermined value or higher, the traveling speed of the vehicle 10 is regulated so that the traveling speed of the vehicle 10 becomes a predetermined speed or lower.

14 Claims, 20 Drawing Sheets

FOREIGN PATENT DOCUMENTS

| | | | |
|---|---|---|---|
| EP | 1475297 A1 | 11/2004 | |
| JP | 1113532 A | 5/1989 | |
| JP | 4046268 A | 2/1992 | |
| JP | H08-175412 A | 7/1996 | |
| JP | 10-158000 | 6/1998 | |
| JP | 11-11272 A | 1/1999 | |
| JP | 2001030933 A | 2/2001 | |
| JP | 2001-180899 | 7/2001 | |
| JP | 2001180899 A | 7/2001 | |
| JP | 2002079816 A | 3/2002 | |
| JP | 2003327150 A | 11/2003 | |
| JP | 2004175230 A | * | 6/2004 |
| JP | 2004224187 A | 8/2004 | |
| JP | 2005-096894 A | 4/2005 | |

OTHER PUBLICATIONS

Supplemental European Search Report dated Feb. 26, 2009; Application No. EP 06 74 7201.

Japanese Office Action "Notification of Rejection" dated Feb. 9, 2010; JP Patent Application No. 2006-150253.

Japanese Office Action "Notice of Reasons for Rejection" dated Aug. 4, 2010; Japanese Patent Application No. 2006-150253.

Japanese Office Action "Notice of Reasons for Rejection" with mailing date of Feb. 4, 2011; Japanese Patent Application No. 2005-158738.

* cited by examiner

STRAIGHT MOVEMENT
→ GENTLE LEFT STEERING

LEFT ROTATION MOVEMENT → RIGHT ROTATION MOVEMENT

FORCIBLE SPEED REDUCTION

TRAVEL CONTROL APPARATUS FOR A VEHICLE

TECHNICAL FIELD

The present invention relates to a travel control apparatus for a wheel-driven vehicle.

BACKGROUND ART

As a wheel-driven vehicle, there is known an elevating work vehicle in which the vehicle main body is attached with, for example, a work table via elevation means. There are various types of such elevating work vehicles, among which relatively small vehicles are provided with a vertical elevating device (an expansion post, scissors mechanism, or the like) and a work table is attached to this vertical elevating device. Such elevating work vehicle is designed so that an operator on the work table can operate, from the work table, a drive of the vehicle and elevation of the work table (see, for example, Japanese Patent Application Laid-Open No. H10-158000 and Japanese Patent Application Laid-Open No. 2001-180899).

The operation of a drive of a vehicle in the above-mentioned type of work table is performed by the operator operating drive stop operation means (comprising, for example, a lever, a dial, and the like) for switching between starting and stopping and between a forward movement and a backward movement of the vehicle, and steering the vehicle, i.e. operating steering operation means (comprising, for example, a lever, a dial and the like). When the vehicle is steered by the operator while the vehicle is moving, the controller, which is provided on the work table or the vehicle, actuates a steering actuator (normal hydraulic cylinder) so that the steering angle of steering wheels detected by a steering angle detector becomes the target steering angle of the steering wheels which is set in accordance with an operational state of the steering operation means, and changes the steering angle of the steering wheels by means of a link mechanism (steering link mechanism). It should be noted here that "steering angle of the steering wheels" means a deflection angle of the steering wheels with respect to the front and rear central axes of the vehicle.

In the above work vehicle, the traveling speed of the vehicle can be changed by adjusting the operation condition of the travel stop operation means. However, when setting the target steering angle large (setting the target steering angle to a large value) while the vehicle is moving straight, and shifting to a rotating movement with a small curvature radius, the steering angle of the steering wheels cannot follow the target steering angle unless the operator reduces the traveling speed consciously, thus the vehicular trajectory deviates sharply from the target trajectory. Therefore, in the present work vehicle, when the target steering angle is changed to a large value while the vehicle is moving, the traveling speed of the vehicle is regulated to a predetermined speed or lower (or forcibly reduced depending on the traveling speed before steering is performed).

DISCLOSURE OF THE INVENTION

However, since the traveling speed of the vehicle of the above work vehicle is restricted only when the target steering angle is set to a large value, the traveling speed is already increased and returned to the original speed when the target steering angle is returned close to the steering angle for straight movement to shift from the rotating movement to the straight movement. Therefore, in the case where the direction of the rotating movement is inverted, when the travel operation is changed from, for example, a counter-clockwise rotating movement to a clockwise rotating movement, the steering operation means is changed from the operation position for counter-clockwise rotating movement command to the operation position for clockwise rotating movement command after passing the neutral position once. However, the speed of the vehicle is increased even during the rotating movement thereof because the actual change in the steering angle is delayed compared to the change in the target steering angle, thus there was a problem in which the vehicular trajectory deviates sharply from the target trajectory. Moreover, in the case of an elevating work vehicle, the operator often loses his balance on the work table by receiving inertia force generated by the speed increased during a rotating movement.

Incidentally, in steering apparatuses for steering wheels by means of the above-mentioned steering link mechanism, generally the amount of change in the steering angle of the steering wheels with respect to the amount of actuation of the actuator (in the case of a hydraulic cylinder, the amount of change in the length thereof) is larger in a region where the steering angle of steering wheels is large, compared to that in a region where the steering angle of steering wheels is small. For this reason, if the operation speed of the actuator is constant at all times, the speed of change in the steering angle of the steering wheels becomes larger in the region where the steering angle of the steering wheels is large, compared to the region where the steering angle of the steering wheels is small. Therefore, it is difficult to fix the position of the steering wheels on the position of the target steering angle in the region where the steering angle of the steering wheels large, compared to the region where the steering angle of the steering wheels is small, hence it is difficult to accurately perform control of the steering angle.

It should be noted that such steering apparatus generally comprises a steering mechanism consisting of a pair of knuckle arms for swingably supporting the steering wheels around a kingpin axis and a tie rod for connecting the pair of knuckle arms, and a steering actuator which is linked to this steering, wherein the steering mechanism is driven by the actuation of the steering actuator, and thereby the steering angle of the steering wheels can be changed.

Incidentally, the steering mechanism used in the above type of work vehicle is generally called "Ackerman link mechanism" characterized in that the difference occurs in the steering angles between inner and outer wheels during a rotation. In the conventional steering apparatus, on the basis of this characteristic, a steering angle of steering wheels which is an outer wheel (or inner wheel) is detected by steering angle detection means, and the actuation of the steering actuator is controlled so that the detected value becomes a target steering angle which is set in accordance with the operation condition of an operating device.

In accordance with the above fact, in the conventional steering apparatus it was necessary to attach the steering angle detection means to both of a pair of right and left steering wheels. Moreover, it took a lot of trouble to perform a complicated adjustment work for conforming the detected steering angle, the operational state of the operating device, and the amount of actuation of the steering actuator to one another in each of the lo steering angle detection means attached to the pair of right and left steering wheels. Moreover, every time when the angles of the right and steering wheels which are outer wheels (or inner wheels) change, the steering angle detection means for referring to the steering angles also was required to be changed, thus control thereof was complicated.

The present invention is contrived in view of such problems, and an object thereof is to provide a travel control apparatus for a vehicle which is configured so that a movement trajectory of a vehicle can be caused to conform with a target trajectory even in a case in which the direction of a rotating movement is inverted.

Other object of the present invention is to provide a travel control apparatus for a work vehicle which is configured so that steering wheels can be caused to stop accurately at the position of the target steering angle even in a region where the steering angle of the steering wheels is large.

Yet another object of the present invention is to provide a travel control apparatus comprising a steering apparatus which can change the angle of the steering wheels to a desired steering angle by means of a simple structure and simple control.

MEANS TO SOLVE THE PROBLEMS

The travel control apparatus for a vehicle according to the present invention is a travel control apparatus for a wheel-driven vehicle, comprising: steering operation means (for example, a steering dial 42 in an embodiment) for steering a steering wheel (for example, a front wheel 11a in the embodiment) of the vehicle; steering angle detection means (for example, a steering angle detector 62 in the embodiment) for detecting a steering angle of the steering wheel; a steering actuator (for example, a steering cylinder 17 in the embodiment) which changes the steering angle of the steering wheel; steering control means (for example, a controller 50 and a steering control valve 52 in the embodiment) for performing a control for actuating the steering actuator so that the steering angle of the steering wheel, which is detected by the steering angle detection means, becomes a target steering angle of the steering wheel which is set in response to an operation command outputted from the steering operation means; and traveling speed regulating means (for example, the controller 50 and a travel stop control valve 51 in the embodiment) for regulating the traveling speed of the vehicle in accordance with an operational state of the steering operation means and an actuation state of the steering actuator. Here, the steering angle of the steering wheel means a deflection angle of the steering wheel with respect to the front and rear central axes of the vehicle.

In the travel control apparatus having such configuration, preferably, the traveling speed regulating means compares the target steering angle of the steering wheel, which is set in accordance with an operational state of the steering operation means, with the detected steering angle of the steering wheel, which is detected by the steering angle detection means, and, when the difference between the target steering angle and the detected steering angle is a predetermined value or higher, regulates the traveling speed of the vehicle to a predetermined speed or lower.

Further, in the travel control apparatus, the traveling lo speed regulating means may perform control for comparing the target steering angle of the steering wheel, which is set in accordance with an operational state of the steering operation means, with the detected steering angle of the steering wheel, which is detected by the steering angle detection means, and gradually reducing the traveling speed of the vehicle as the difference between the target steering angle and the detected steering angle increases.

In this case, it is preferred that the traveling speed regulating means set a deceleration which increases as the difference increases, and perform a control for gradually reducing the traveling speed of the vehicle on the basis of the set deceleration.

Furthermore, the travel control apparatus may further comprise steering operation speed detection means for obtaining an operation speed of the steering operation means, wherein, when the operation speed of the steering operation means, which is obtained by the steering operation speed detection means, is a predetermined value or higher, the traveling speed regulating means may regulate the traveling speed of the vehicle to a predetermined speed or lower.

Moreover, the travel control apparatus may further comprise steering operation speed detection means for obtaining an operation speed of the steering operation means, wherein, when the operation speed of the steering operation means, which is obtained by the steering operation speed detection means, is a predetermined value or higher, the traveling speed regulating means may perform a control for gradually reducing the traveling speed of the vehicle as the operation speed increases.

In this case, it is preferred that the traveling speed regulating means set a deceleration which increases as the operation speed increases, and perform a control for gradually reducing the traveling speed of the vehicle on the basis of the set deceleration.

The travel control apparatus may further comprise steering actuator actuation speed detection means for obtaining an actuation speed of the steering actuator, wherein, when the actuation speed of the steering actuator, which is obtained by the steering actuator actuation speed detection means, is a predetermined value or higher, the traveling speed regulating means may regulate the traveling speed of the vehicle to a predetermined speed or lower.

The travel control apparatus may further comprise steering actuator actuation speed detection means for obtaining an actuation speed of the steering actuator, wherein, when the actuation speed of the steering actuator, which is obtained by the steering actuator actuation speed detection means, is a predetermined value or higher, the traveling speed regulating means may perform a control for gradually reducing the traveling speed of the vehicle as the actuation speed increases.

In this case, it is preferred that the traveling speed regulating means set a deceleration which increases as the actuation speed increases, and perform a control for gradually reducing the traveling speed of the vehicle on the basis of the set deceleration.

According to the travel control apparatus for a vehicle which is configured as described above, the traveling speed regulating means regulates the traveling speed of the vehicle in accordance with the operation condition of the steering operation means and the actuation condition of the steering actuator, thus, when there is a case in which the direction of a rotating movement is inverted, a control for conforming the movement trajectory of the traveling body to a target trajectory can be performed easily.

It should be noted that in the configuration in which, when the difference between the target steering angle of the steering wheel, which is set in accordance with the operation condition of the steering operation means, and the steering angle of the steering wheel, which is detected by the steering angle detection means (detected steering angle), is a predetermined value or higher, the traveling speed of the vehicle is regulated to a predetermined speed or lower (forcibly reduced depending on the traveling speed before steering is performed), even when the direction of a rotating movement is inverted, the traveling speed is kept low during the period in which the actual steering angle of the steering wheel is not sufficiently conformed with the target steering angle. Accordingly, the movement trajectory of the vehicle can be caused to conform with the target trajectory without excessively increasing the traveling speed of the vehicle.

Furthermore, when the steering operation means is operated quickly (the difference between the target steering angle of the steering wheel and the detected steering wheel of the steering wheel is large at this moment) so that the operation speed of the steering operation means which is detected by the steering operation speed detection means reaches a predetermined value or higher, by making a configuration in which the traveling speed of the vehicle is regulated to a predetermined speed or lower (forcibly reducing the traveling speed depending on the traveling speed before steering is performed), the traveling speed is kept low during the period in which the actual steering angle of the steering wheel is not sufficiently conformed with the target steering angle when the direction of the rotating movement is inverted. Accordingly, the movement trajectory of the vehicle can be caused to conform with the target trajectory without excessively increasing the traveling speed of the vehicle.

Moreover, when the steering operation means is operated quickly (the difference between the target steering angle of the steering wheel and the detected steering wheel of the steering wheel is large at this moment) so that the actuation speed of the steering actuator reaches a predetermined value or higher in an attempt to cause the detected steering angle of the steering wheel to be conformed with the target steering angle, by making a configuration in which the traveling speed of the vehicle is regulated to a predetermined speed or lower (forcibly reduced depending on the traveling speed before steering is performed) during the period in which the actuation speed of the steering actuator is at least a predetermined value or higher, the traveling speed is kept low during the period in which the actual steering angle of the steering wheel is not sufficiently conformed with the target steering angle when the direction of the rotating movement is inverted. Accordingly, the movement trajectory of the vehicle can be caused to conform with the target trajectory without excessively increasing the traveling speed of the vehicle.

In the travel control apparatus with the above configuration, preferably the steering control means actuates the steering actuator at a first actuation speed if the size of the steering angle, which is obtained on the basis of detection information from the steering angle detection means, is a predefined reference amount or lower, and actuates the steering actuator at a second actuation speed, which is lower than the first actuation speed, for the same operation command when the size of the steering angle exceeds the reference amount. It should be noted that preferably the steering control means actuates the steering actuator at the first actuation speed when the target steering angle is set so that the size of the steering angle becomes the reference amount or lower from the state in which the size of the steering angle exceeds the reference amount, even if the size of the steering angle still exceeds the reference amount.

Moreover, the larger the steering angle with respect to a straight forward direction of the steering wheel, the steering angle being detected by the steering angle detection means, preferably the slower the actuation speed of the steering actuator actuated by the steering control means.

In the travel control apparatus with the above configuration according of present invention, when the size of the steering angle of the steering wheel (absolute value) exceeds the predefined reference amount, the steering actuator is actuated at an actuation speed lower than when the size of the steering angle of the steering wheel is equal to or lower than the reference amount, thus even in a region in which the size of the steering angle of the steering wheel exceeds the reference amount and the amount of change in the steering angle of the steering wheel with respect to the amount of actuation of the steering actuator is large (region in which the size of the steering angle of the steering wheel exceeds the reference amount), the steering wheel can be caused to stop at the position of the target steering angle accurately.

Here, when the target steering angle is set so that the size of the steering angle is changed to the reference amount or lower from the state in which the size of the steering angle of the steering wheel exceeds the reference amount, even if the size of the steering angle exceeds the reference amount, it is preferred that the steering actuator be actuated at the same actuation speed as when the size of the steering angle is equal to or lower than the reference amount. With this configuration, the actuation speed of the steering actuator is not restricted unnecessarily until the size of the steering angle becomes the reference amount or lower, hence actuation delay of the steering wheel in a steering operation can be eliminated.

Moreover, the larger the steering angle of the steering wheel, the slower the actuation speed to actuate the steering actuator. With this configuration, even in the region in which the amount of change in the steering angle of the steering wheel with respect to the amount of actuation of the steering actuator is large (region in which the steering angle of the steering wheel is comparatively large), the steering wheel can be caused to stop at the position of the target steering angle accurately.

In addition, preferably, the travel control apparatus with the above configuration according to the present invention comprises a steering mechanism consisting of a pair of knuckle arms for swingably supporting the steering wheels around kingpin axes and a tie rod for connecting the pair of knuckle arms, the steering actuator drives the steering mechanism to change the steering angles of the steering wheels, the steering angle detection means is attached to one of the pair of right and left steering wheels, and the steering control means performs a control for actuating the steering actuator so that one of the steering angles of the pair of right and left steering wheels detected by the steering angle detection means becomes the target steering angle which is set in response to an operation command outputted from the steering operation means.

In the travel control apparatus of the present invention, which is configured as above, the steering angle detector can be attached to one of a pair of right and left steering wheels, actuation of the steering actuator can be controlled on the basis of the steering angle detected by the detector, and the angle of the steering wheel can be changed to a desired steering angle. In this manner, a travel control apparatus which has a simple configuration and can be controlled easily, compared to the prior art, can be obtained.

It should be noted that preferably the steering mechanism is characterized in that a difference is generated between the steering angles of the pair of right and left steering wheels when the vehicle rotates, the target steering angle is set for one of the pair of right and left steering wheels to which the steering angle detection means is attached, in accordance with an operation direction and the amount of operation of the steering operation means, and the steering control means performs a control for actuating the steering actuator on the basis of the characteristic of the steering mechanism so that the steering angle of one of the pair of right and left steering wheels, which is detected by the steering angle detection means, becomes the target steering angle which is set in accordance with the operation direction and the amount of operation of the steering operation means.

With such configuration, the travel control apparatus of the present invention can attach the steering angle detector to one of a pair of right and left steering wheel, associate a result of detection performed by the detector with the operation direction/operation amount of the steering operation means on the basis of the characteristic that a difference is generated between the inner and outer wheels when the vehicle rotates, control the actuation of the steering actuator, and change the angle of the steering wheel to a desired steering angle. In this manner, it is possible to obtain a travel control apparatus which has a simple configuration and can be controlled easily.

BRIEF DESCRIPTION OF THE DRAWINGS

FIG. 4 is a figure showing the relationship between the stretch amount of a steering cylinder and the steering angle of a front wheel in the elevating work vehicle, wherein

FIG. 18 is a figure showing the relationship between the stretch amount of the steering cylinder and the steering angle of the front wheels in the elevating work vehicle, wherein

BEST MODE FOR CARRYING OUT THE INVENTION

Figure 1:
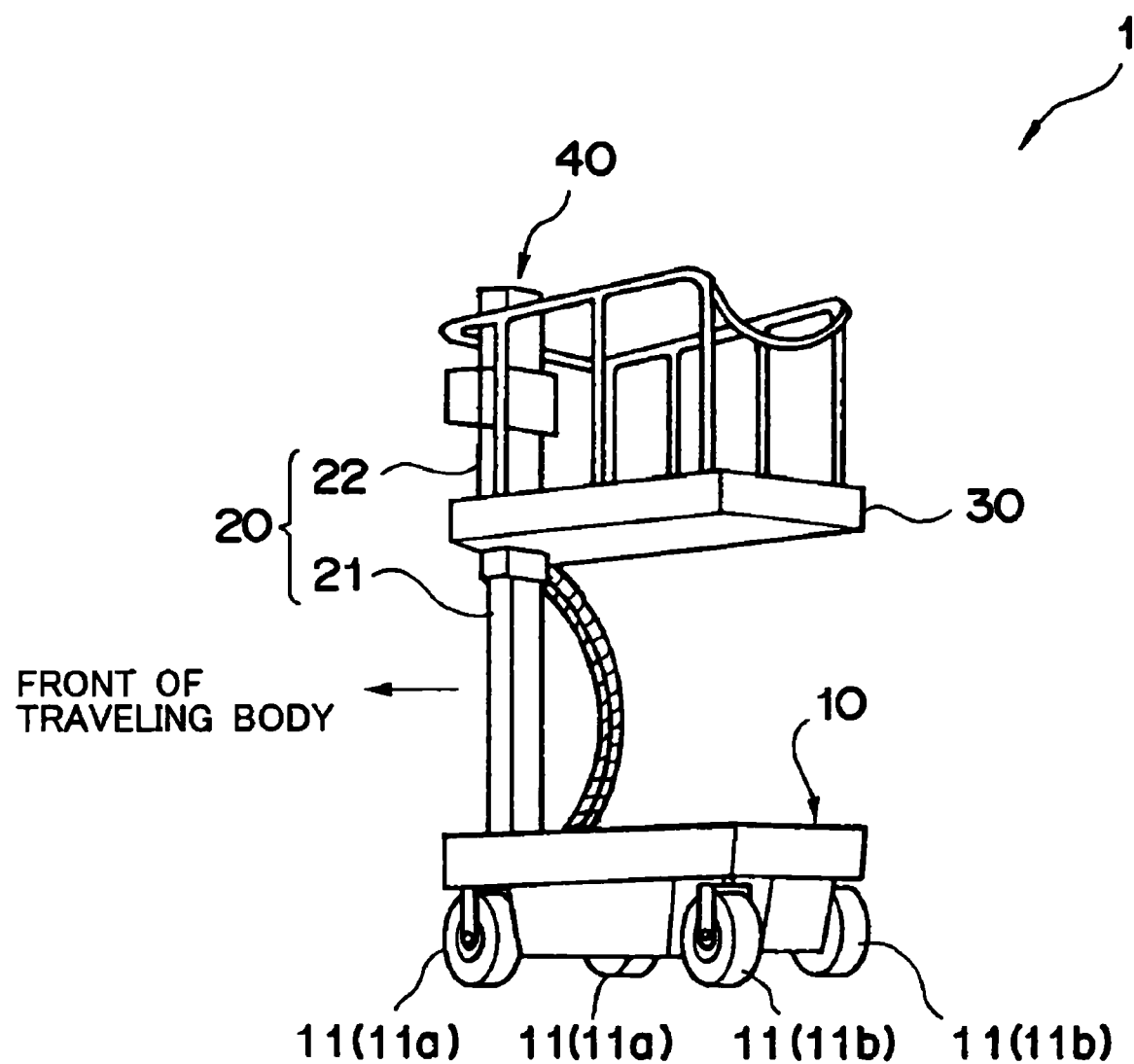
FIG. 1 is a figure in which the elevating work vehicle is viewed from behind diagonally.

Hereinafter, preferred embodiments of the present invention are described with reference to the drawings. FIG. 1 shows an elevating work vehicle 1 comprising a travel control apparatus for a vehicle according to a first embodiment of the present invention. This elevating work vehicle 1 is a so-called "vertical elevating type elevating work vehicle", and comprises a wheel-driven vehicle 10, an expansion post 20 which is a vertical elevating device provided in a vertically upward extending fashion on the vehicle 10, and a work table 30 which is supported by the expansion post 20 and on which an operator stands. The vehicle 10 comprises tire wheels 11 at the front, back, right, and left sides and a drive motor (hydraulic motor) 12 inside thereof (see FIG. 3), drives the rear tire wheel 11 (referred to as "rear wheel 11b". hereinafter) by means of the drive motor 12, and steers the front tire wheel 11 (referred to as "front wheel 11a" hereinafter) so that the vehicle 10 can travel.

The expansion post 20 comprises a lower post 21, which is provided in a vertically upward extending fashion in the vehicle 10, and an upper post 22, which is provided in a nested fashion with respect to the lower post 21, and can extend in the vertical direction by means of an expansion operation of a built-in elevating cylinder (hydraulic cylinder) 23 (see FIG. 2) (can raise the upper post 22). The work table 30 is attached to the upper post 22 and can be elevated by the vertical expansion operation of the expansion post 20.

Figure 5:
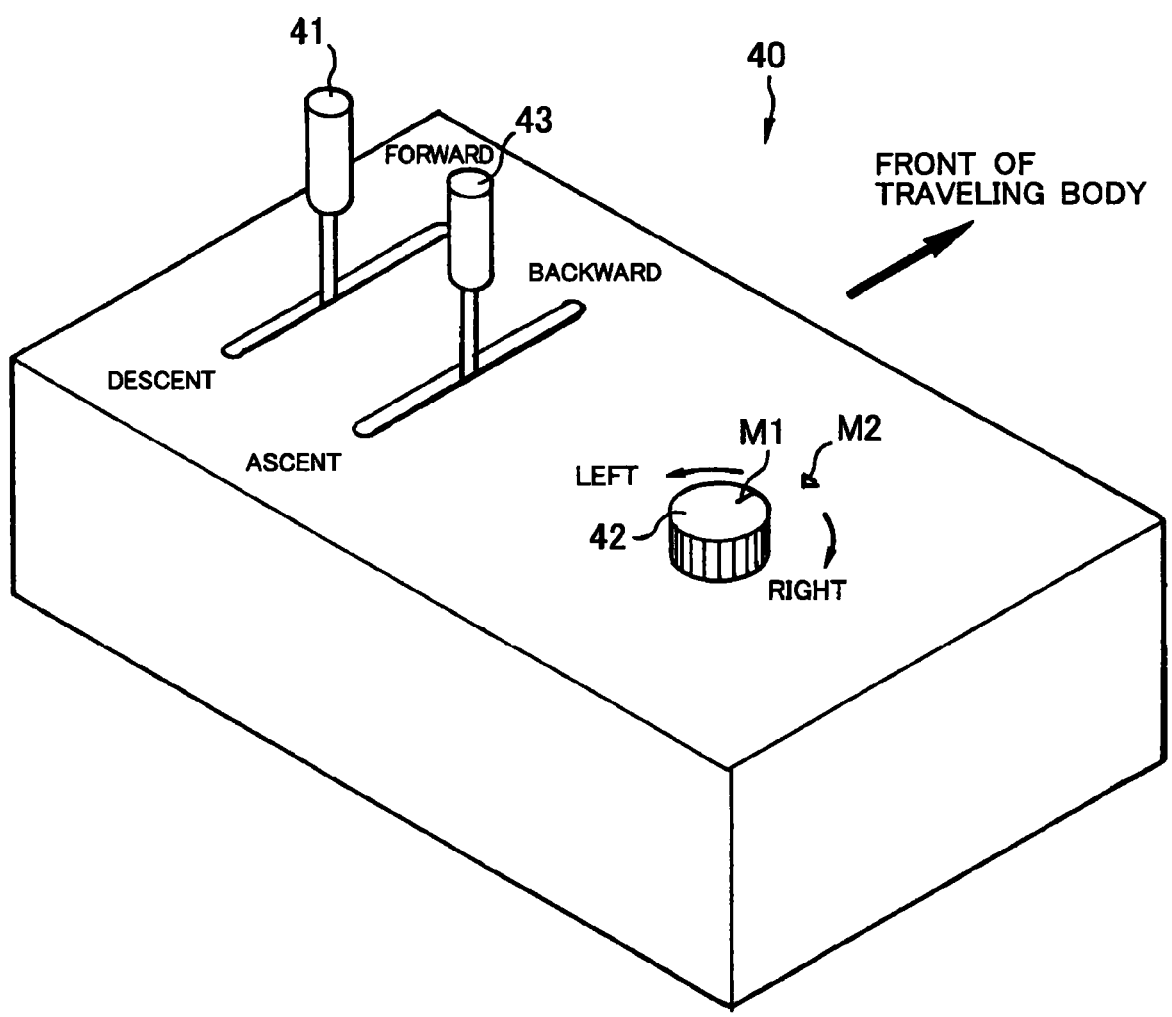
FIG. 5 is a perspective view of an operation box provided on the work table of the elevating work vehicle.

The work table 30 is provided with an operation box 40 which comprises a travel stop operation lever 41 which switches between starting and stopping and between a forward movement and a backward movement of the vehicle, and steering the vehicle 10, a steering dial 42 for steering the traveling vehicle 10, i.e. for performing a steering operation on a front wheel 11a which is a steering wheel, and an elevation operation lever 43 which performs an elevation operation on the work table 30 (see FIG. 1 and FIG. 5). The operator on the work table 30 can causes the vehicle 10 to travel and the work table 30 to elevate while standing on the work table 30, by operating the travel stop operation lever 41, the steering dial 42 and the elevation operation lever 43.

A steering mechanism of the front wheel 11a which is a steering wheel comprises a steering link mechanism 13 which is linked to the front wheels 11a, a steering cylinder (hydraulic cylinder) 17 which drives this steering link mechanism 13 to change a steering angle γ of the front wheels 11a (deflection angle of the front wheels 11a with respect to the front and rear central axes of the vehicle 10, see FIG. 4.), and a controller 50 which actuates and controls the steering cylinder 17 in response to an operation of the steering dial 42.

Figure 3:
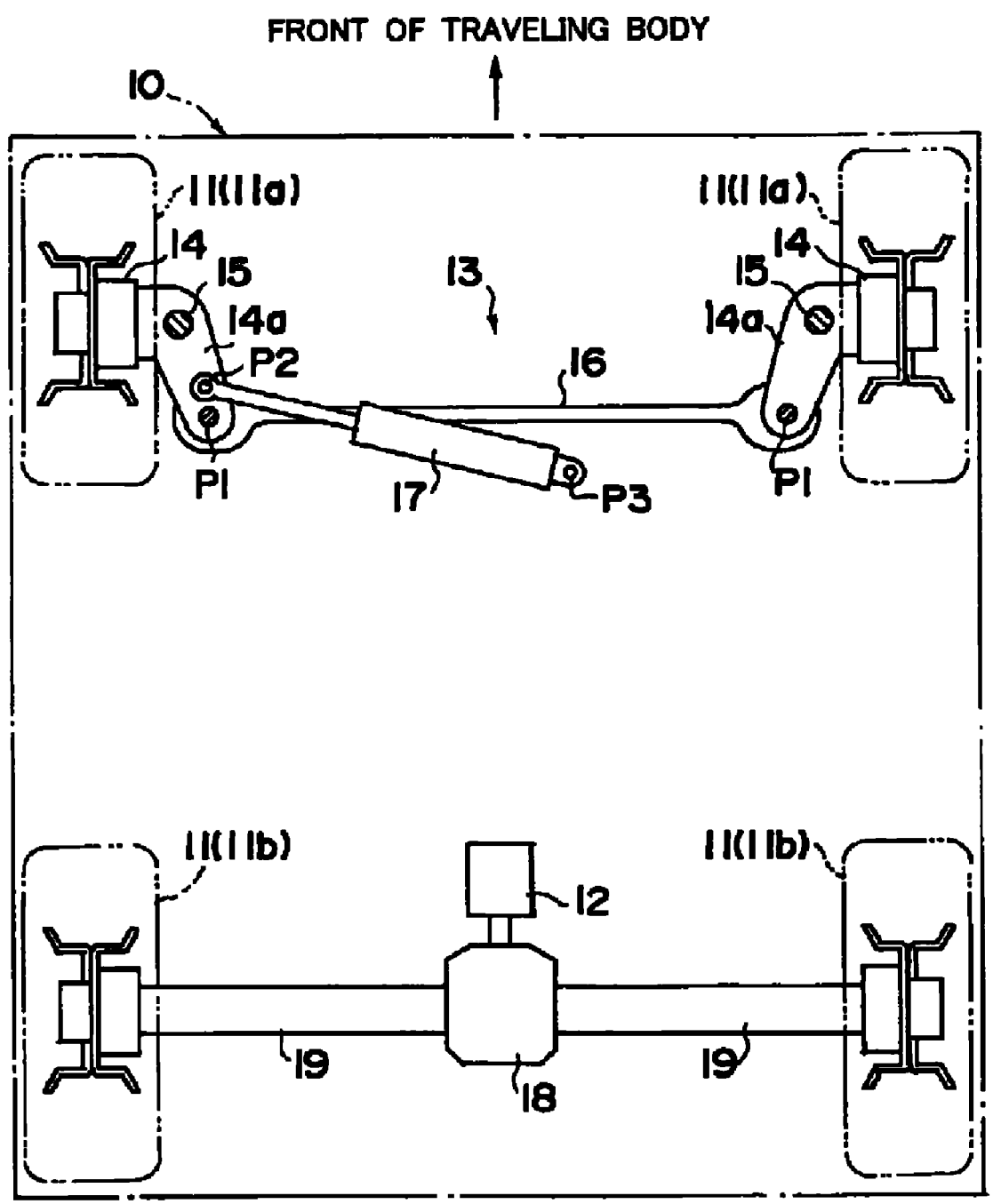
FIG. 3 is a plan view showing a configuration of the travel apparatus provided in the vehicle of the elevating work vehicle.

As shown in FIG. 3, the steering link mechanism 13 comprises right and left front wheel supporting members 14 which rotatably support the front wheels 11a and a tie rod 16 which connects the right and left front wheel supporting member 14. The right and left wheel supporting members 14 are respectively attached to the vehicle 10 via kingpins 15 extending in a vertical direction so as to be able to swing around the kingpins 15. Moreover, each of the right and left front wheel supporting members 14 is provided with an arm section 14a extending to the back of the vehicle 10, and both end sections of the tie rod 16 are connected to these right and left arm sections 14a via a connecting pin P1.

Figure 4A:
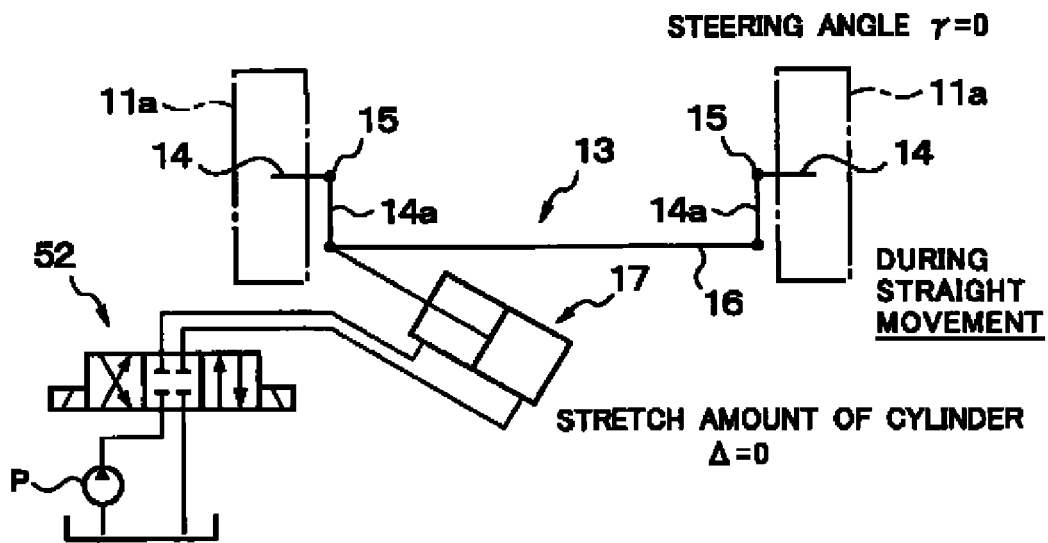
FIG. 4(A) shows a state in which the stretch amount of the steering cylinder is zero.
Figure 4B:
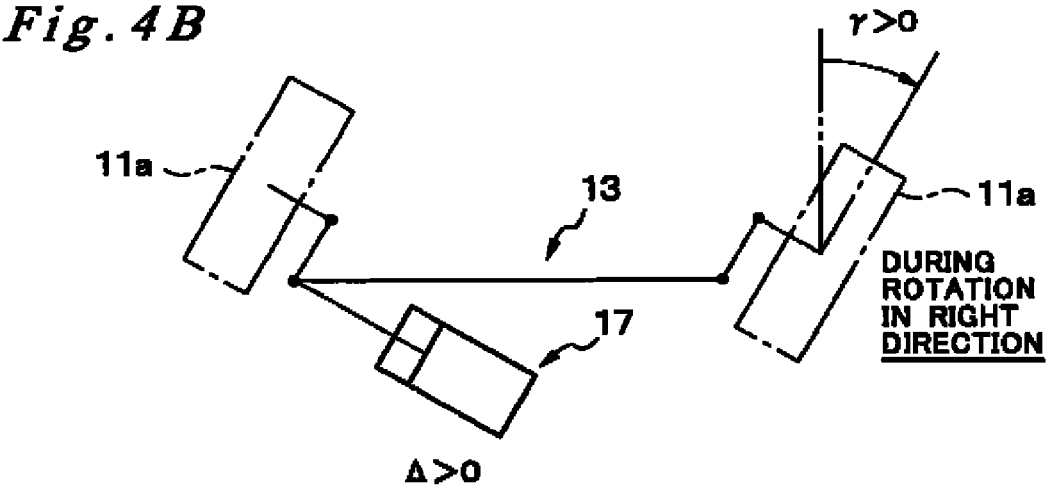
FIG. 4(B) shows a state in which the stretch amount of the steering cylinder is a positive value.
Figure 4C:
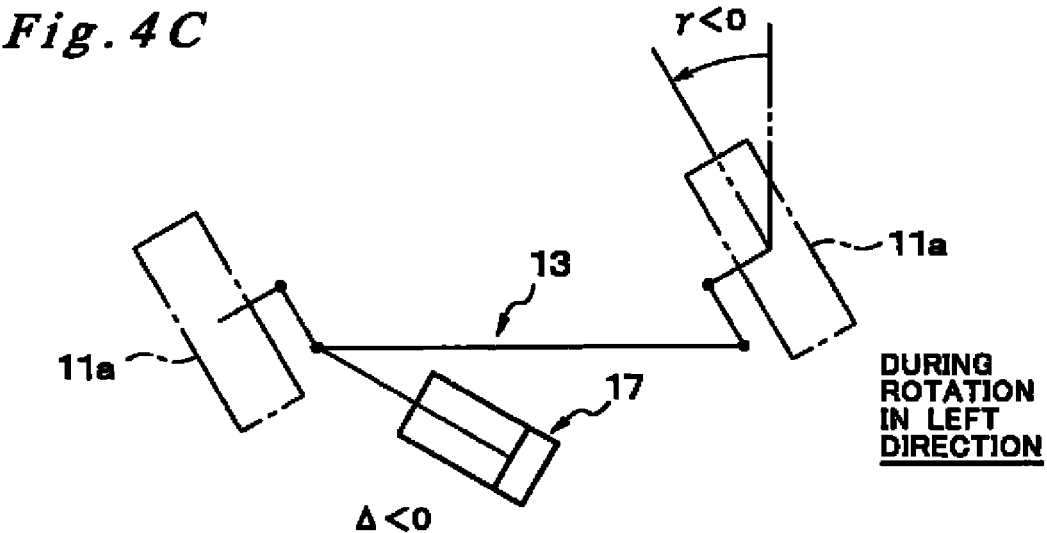
FIG. 4(C) shows a state in which the stretch amount of the steering cylinder is a negative value.

One end section of the steering cylinder 17 is connected the arm section 14a of the left front wheel supporting member 14 configuring the steering link mechanism 13, via a connecting pin P2, and other end section of the steering cylinder 17, which is not shown, is connected to a cylinder connecting section of the vehicle 10 via a connecting pin P3. Therefore, by causing the steering cylinder 17 to perform an expansion operation, the left front wheel supporting member 14 can be caused to swing around the kingpin 15 and the right front wheel supporting member 14 can be caused to swing via the tie rod 16, simultaneously with the left front wheel supporting member 14 in the same direction. Further, by causing the steering cylinder 17 to perform a stretch operation, the right and left front wheels 11a can be directed to the right, and by causing the steering cylinder 17 to perform a contraction operation, the right and left front wheels 11a can be directed to the left. Furthermore, as shown in FIG. 4, suppose that the expansion amount Δ of the steering cylinder 17 is zero (Δ=0) when a steering angle γ of the front wheel 11a is zero (γ=0) (see FIG. 4(A)), that the symbol for the steering angle γ is positive when the front wheels ha are deflected in the right direction, and that the symbol for the steering angle γ is negative when the front wheels 11a are deflected to the left direction, the steering angle γ of the front wheels 11a is a positive value (γ>0) when the stretch amount Δ of the steering cylinder 17 is a positive value (Δ>0) (see FIG. 4(B)), and the steering angle γ of the front wheel 11a is a negative value (γ<0) when the stretch amount Δ of the steering cylinder 17 is a negative value (Δ<0) (see FIG. 4(C)).

Figure 2:
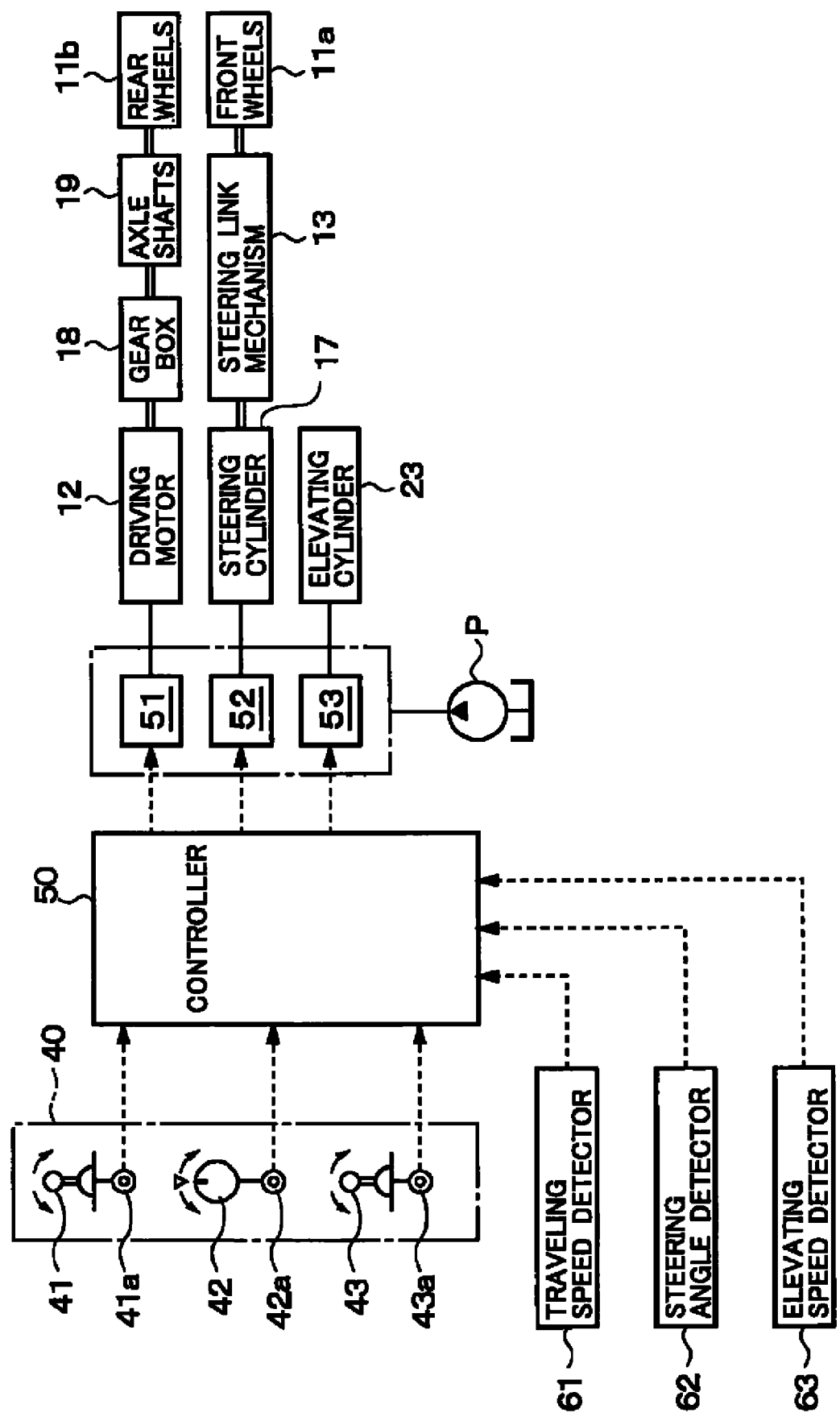
FIG. 2 is a block diagram showing a communication channel for a signal and mechanical force in relation to a travel operation of the vehicle and an elevation movement of the work table in the elevating work vehicle which comprises a travel control apparatus for a vehicle, according to a first embodiment of the present invention.

FIG. 2 shows a communication channel for a signal and mechanical force in relation to a travel operation of the vehicle 10 and an elevation movement of and the work table 30. The travel stop operation lever 41 provided in the operation box 40 of the work table 30 is positioned on a neutral position in a non-operational state thereof (a vertical position as shown in FIG. 5), and can be tilted forward or backward with reference to this neutral position. The travel stop operation lever 41 is automatically returned to the neutral position by a force of an embedded spring, when letting go of a tilted state thereof. An operational state of the travel stop operation lever 41 (an operation direction and operation amount with reference to the neutral position) can be detected by a travel stop operation detector 41a which comprises a potentiometer and the like provided in the operation box 40. The information on an operational state of the travel stop operation lever 41, which is detected by the travel stop operation detector 41a, is inputted by the controller 50 (provided in the work table 30 or the vehicle 10). Here, a forward tilting operation of the travel stop operation lever 41 from the neutral position thereof is same as forward travel command for the vehicle 10, and target traveling speed for forward travel is set to a large value by the controller 50 when the amount of this tilting operation is large. Moreover, a backward tilting operation of the travel stop operation lever 41 from the neutral position thereof is same as backward travel command for the vehicle 10, and target traveling speed for backward travel is set to a large value by the controller 50 when the amount of this tilting operation is large. In addition, an operation for returning the travel stop operation lever 41 to the neutral position is same as stop command for the vehicle 10.

The steering dial 42 is positioned on a neutral position in a non-operational state thereof (a position in which a mark M1 marked on the steering dial 42 is conformed with a mark M2 marked on the operation box 40, as shown in FIG. 5), and can be this neutral position can be twisted to the right (clockwise) or left (counterclockwise) with reference to this neutral position. The steering dial 42 is automatically returned to the neutral position by the force of the embedded spring, when letting go of a twisted state thereof. An operational state of the steering dial 42 (an operation direction and operation amount with reference to the neutral position) can be detected by a steering operation detector 42a which comprises a potentiometer and the like provided in the operation box 40. The information on an operational state of the steering dial 42, which is detected by the steering operation detector 42a, is inputted by the controller 50. Here, a clockwise tilting operation of the steering dial 42 is same as clockwise steering command for the front wheels 11a, and a target steering angle in the right direction is set to a large value by the controller 50 when the amount of clockwise tilting operation with reference to the neutral position is large. Moreover, a counterclockwise tilting operation of the steering dial 42 is same as counterclockwise steering command for the front wheels 11a, and a target steering angle in the left direction is set to a large value by the controller 50 when the amount of counterclockwise tilting operation with reference to the neutral position is large. In addition, an operation for returning the steering dial 42 to the neutral position is same as command for setting the steering angle of the front wheels 11a to zero (γ=0. See FIG. 4(A)).

The elevation operation lever 43 is positioned on a neutral position in a non-operational state thereof (a vertical position as shown in FIG. 5), and can be tilted forward or backward with reference to this neutral position. The elevation operation lever 43 is automatically returned to the neutral position by the force of the embedded spring, when letting go of a tilted state thereof. An operational state of the elevation operation lever 43 (an operation direction and operation amount with reference to the neutral position) can be detected by an elevation operation detector 43a which comprises a potentiometer and the like provided in the operation box 40. The information on an operational state of the elevation operation lever 43, which is detected by the elevation operation detector 43a, is inputted by the controller 50. Here, a forward tilting operation of the elevation operation lever 43 from the neutral position thereof is same as descent command for the work table 30, and target actuation speed of descent of the work table 30 is set to a large value by the controller 50 when the amount of this tilting operation is large. Moreover, a backward tilting operation of the elevation operation lever 43 from the neutral position thereof is same as ascent command for the work table 30, and target actuation speed of ascent of the work table 30 is set to a large value by the controller 50 when the amount of this tilting operation is large. In addition, an operation for returning the elevation operation lever 43 to the neutral position is same as stop command for the work table 30.

The inside of the vehicle 10 is provided with a hydraulic pump P (see FIG. 2) which is driven by a power source (not shown) comprising an electric motor, small engine, and the like. Pressure oil which is discharged from this hydraulic pump P is supplied to the drive motor 12 via the travel stop control valve 51. Here, the right and left rear wheels 11b, which are drive wheels of the vehicle 10, are attached to right and left axle shafts 19 which are driven by the drive motor 12 via a gear box 18 (see FIG. 3). The controller 50 electromagnetically drives a spool (not shown) of the travel stop control valve 51 in a direction and at amount which correspond to an operational state of the travel stop operation lever 41. Accordingly, the operator on the work table 30 can switch between starting and stopping and between directions of movement (a forward movement and a backward movement) of the vehicle 10, and can also set the travel speed of the vehicle 10 by operating the travel stop operation lever 41. Further, the pressure oil which is discharged from the hydraulic pump P is supplied to the steering cylinder 17 via the steering control valve 52 (see also FIG. 4), and the controller 50 electromagnetically drives a spool (not shown) of the steering control valve 52 in a direction and at amount which correspond to an operational state of the steering operation lever 42. Accordingly, the operator on the work table 30 can steer the front wheels 11a by performing expansion operation on the steering cylinder 17, by operating the steering dial 42. Moreover, the pressure oil which is discharged from the hydraulic pump P is supplied to the elevating cylinder 23 via an elevation control valve 53, and the controller 50 electromagnetically drives a spool (not shown) of the elevation control valve 53 in a direction and at amount which correspond to an operational state of the elevation operation lever 43. Accordingly, the operator on the work table 30 can cause the work table 30 to perform an elevation movement, by operating the elevation operation lever 43.

The vehicle 10 is provided with a traveling speed detector 61 which detects traveling speed of the vehicle 10 from the number of rotations of the axle shafts 19 of the rear wheels 11b, and a steering angle detector (potentiometer, for example) 62 which detects a steering angle of the front wheel 11a from a rotation angle around the kingpin 15 of the front wheel supporting members 14. The inside of the expansion post 20 is provided with elevating speed detector 63 which detects elevating speed of the work table is 30 from actuation speed of the elevating cylinder 23 (see FIG. 2). The information on the traveling speed of the vehicle 10, which is detected by the traveling speed detector 61, the information on the steering angle detected by the steering angle detector, and the information on the elevating speed of the work-table 30, which is detected by the elevating speed detector 63, are inputted by the controller 50.

Once the information on an operational state of the travel stop operation lever 41 (an operation direction and operation amount with reference to the neutral position), which is detected by the travel stop operation detector 41a, is inputted, the controller 50 sets a target traveling speed of the vehicle 10 in accordance with the detected operational state of the travel stop operation lever 41, drives the spool of the travel stop control valve 51 so that the traveling speed of the vehicle 10, which is detected by the traveling speed detector 61, becomes the target traveling speed, and controls the number of rotations of the drive motor 12. Moreover, once the information on an operational state of the elevation operation lever 43 (an operation direction and operation amount with reference to the neutral position), which is detected by the elevation operation detector 43a, is inputted, the controller 50 sets a target elevating speed of the vehicle 10 in accordance with the detected operational state of the elevation operation lever 43, drives the spool of the elevation control valve 53 so that the elevating speed of the work table 30, which is detected by the elevating speed detector 63, becomes the target elevating speed, and controls the actuation speed of the elevating cylinder 23.

Further, once the information on an operational state of the steering dial 42 (an operation direction and operation amount with reference to the neutral position), which is detected by the steering operation detector 42a, is inputted, the controller 50 sets a target steering angle of the front wheels 11a in accordance with the detected operational state of the steering dial 42, drives the steering control valve 52 so that the steering angle of the front wheels 11a, which is detected by the steering angle detector 62, becomes the target steering angle, and controls the stretch amount of the steering cylinder 17. For example, when the steering dial 42 is twisted clockwise during a straight movement of the vehicle 10 (the target steering angle and the actual steering angle at this moment are both 0 degree) and thereby the target steering angle is set to 30 degrees clockwise, the controller 50 extends the steering cylinder 17 until the steering angle detected by the steering angle detector 62 is conformed with the target steering angle (30 degrees).

Here, the controller 50 compares the target steering angle of the front wheels 11a, which is set in accordance with an operational state of the steering dial 42, with the steering angle of the front wheels 11a, which is detected by the steering angle detector 62, and, when the difference between the target steering angle the detected steering angle (the steering angle of the front wheels 11a which is detected by the steering angle detector 62) is a predetermined value or higher, regulates the traveling speed of the vehicle 10 (or forcibly reduces, depending on the traveling speed before steering is performed) so that the traveling speed of the vehicle 10 becomes a predetermined speed or lower. Therefore, even when the direction of a rotating movement is inverted (a case shown in FIG. 7, which is described hereinafter), the traveling speed is kept low during the period in which the actual steering angle of the steering wheel is not sufficiently conformed with the target steering angle, and the traveling speed of the vehicle 10 does not increase excessively, thus the movement trajectory of the vehicle 10 can be caused to conform with the target trajectory. It should be noted that such regulation of the traveling speed of the vehicle 10 is performed by, for example, the controller 50 reducing the drive amount of the spool of the travel stop control valve 51 and the number of rotations of the drive motor 12.

Figure 6:
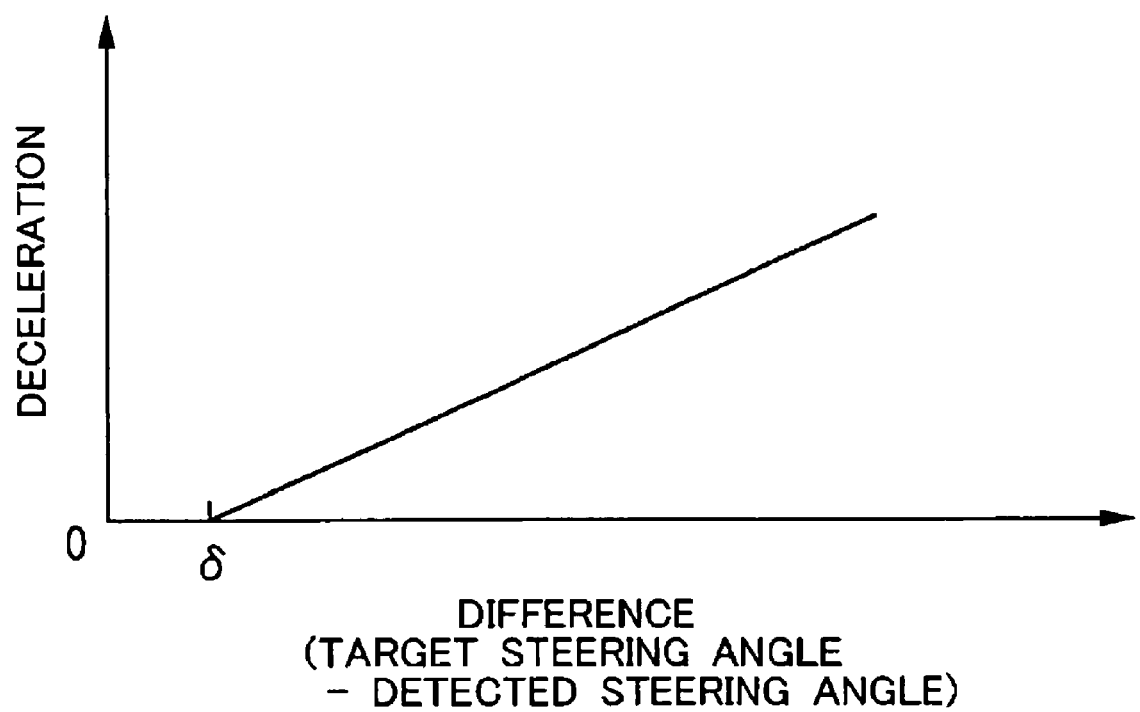
FIG. 6 is a graph showing a deceleration which is set in accordance with the difference between a target steering angle and a detected steering angle.

As a method of regulating the traveling speed as described above, there is a control method for previously setting a predetermined speed and reducing the traveling speed of the vehicle to this predetermined speed if the vehicle travels at higher than the predetermined speed, and a speed regulation control method for previously setting a deceleration in accordance with the difference between a target steering angle and a detected steering angle, as shown in FIG. 6, to obtain this deceleration.

Figure 7A:
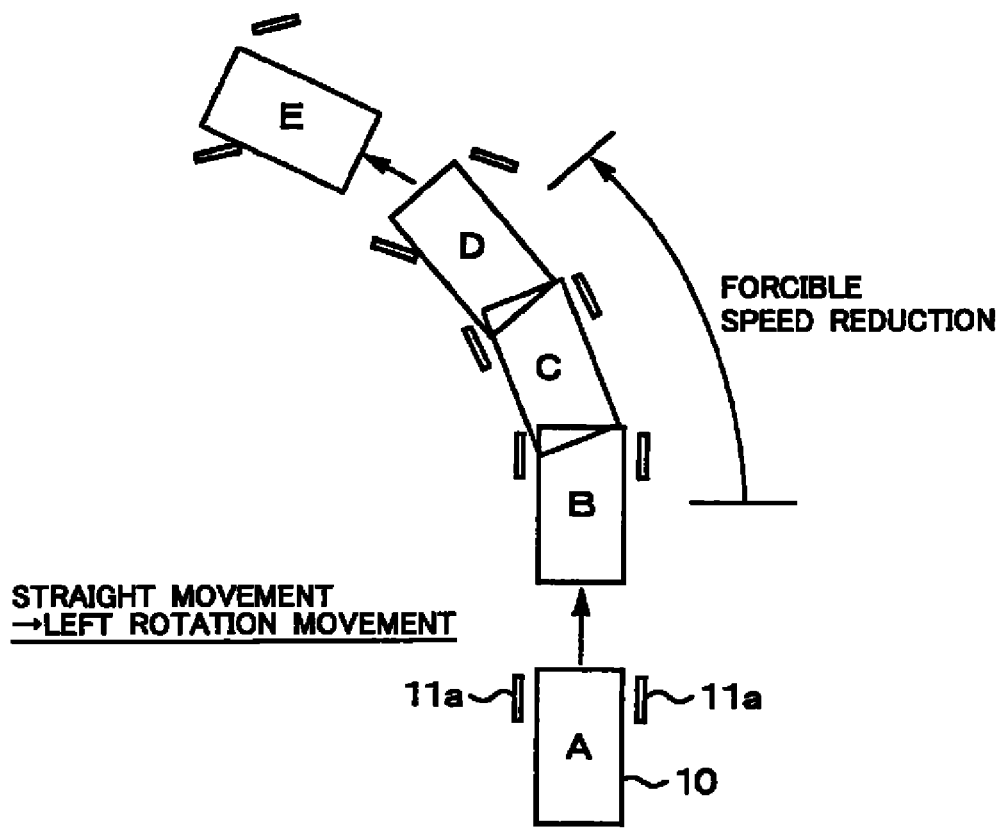
FIG. 7(A) shows a movement trajectory of the vehicle when the elevating work vehicle is shifted from a straight movement to a left rotation movement.
Figure 7B:
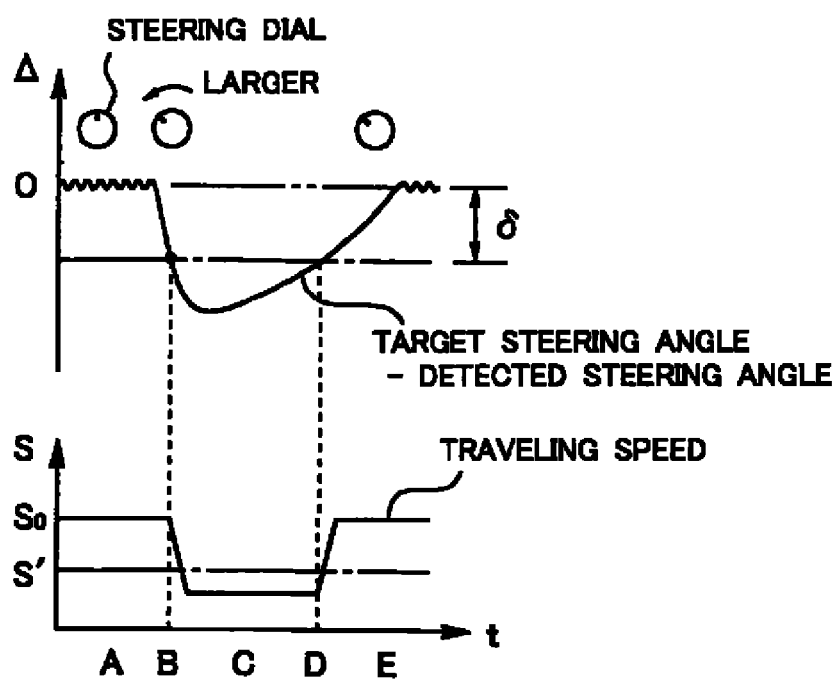
FIG. 7(B) shows a graph (top) showing the time variation of the difference Δ between the target steering angle and the detected steering angle, and a graph (bottom) showing the time variation of traveling speed, both graphs being related to FIG. 7(A)
Figure 8A:
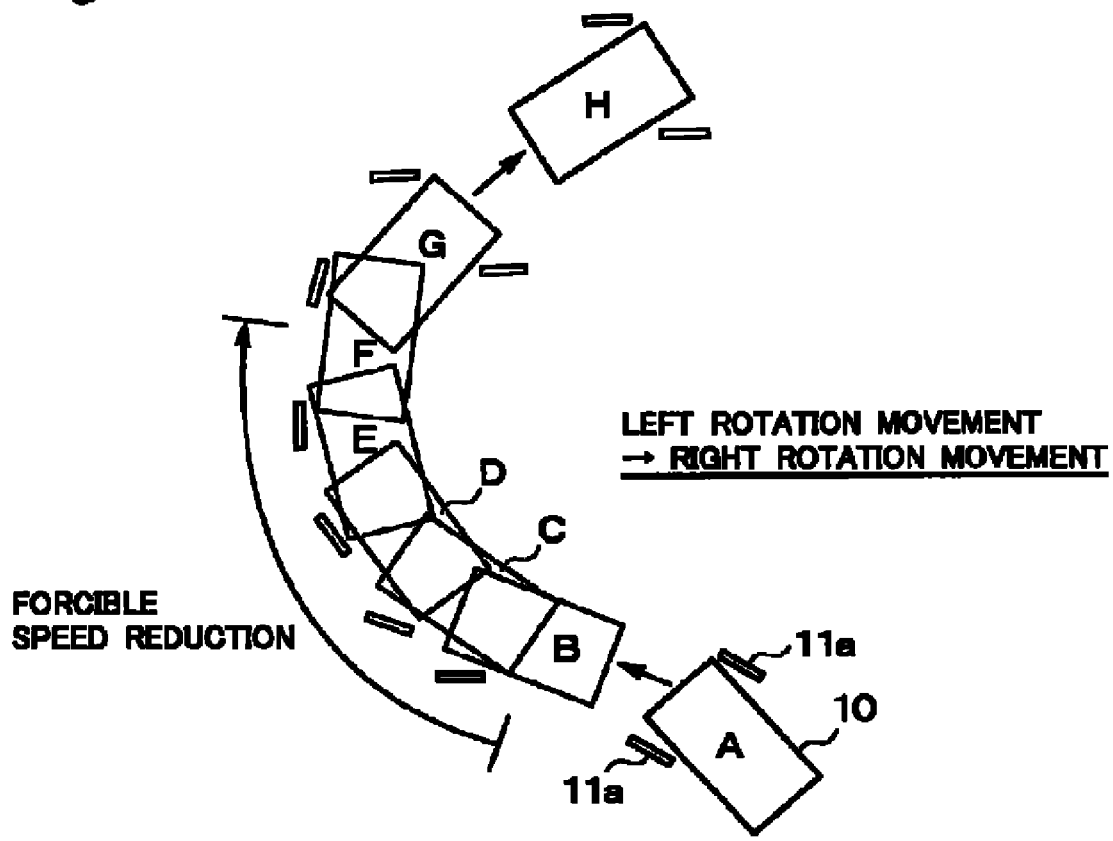
FIG. 8(A) shows a movement trajectory of the vehicle when the elevating work vehicle is shifted from the left rotation movement to a right rotation movement.
Figure 8B:
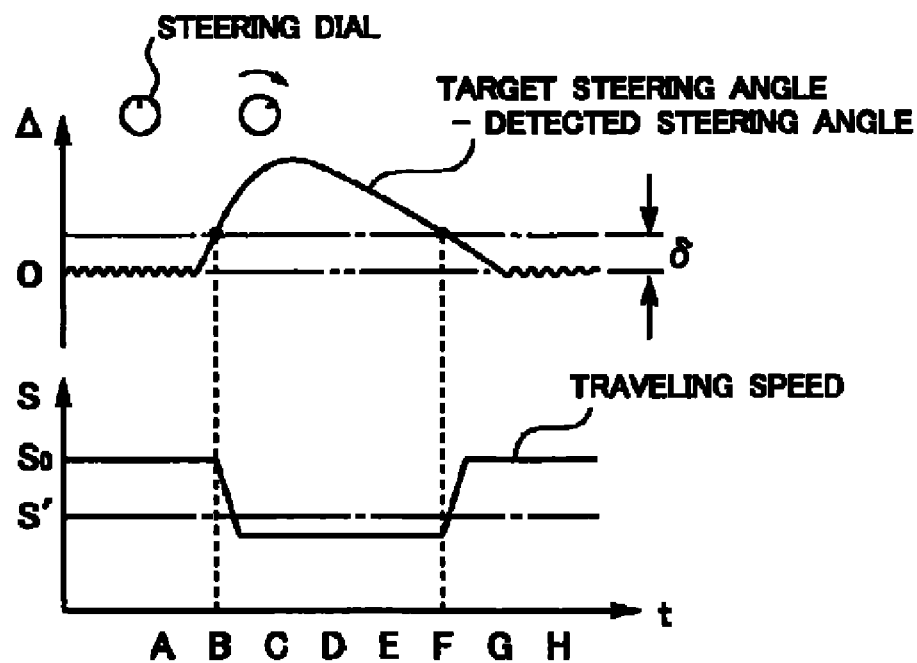
FIG. 8(B) shows a graph (top) showing the time variation of the difference Δ between the target steering angle and the detected steering angle, and a graph (bottom) showing the time variation of traveling speed, both graphs being related to FIG. 8(A)

FIG. 7 and FIG. 8 show an example of a case in which the speed regulation for the vehicle 10 is performed as described above. First, FIG. 7 is an example of a case in which the wheeled 10 is shifted from a straight movement to a left rotation movement. Here, the steering dial 42 is twisted to the left significantly from the neutral position thereof during a straight movement of the vehicle 10 (between the point A and the point B. The target steering angle and the actual steering angle are both 0 degree during the period of these points, and the difference $\Delta$ between these angles is substantially 0). However, during the period in which the steering angle of the front wheel 11a actually becomes a steering angle corresponding to the left rotation immediately after operating the steering dial 42 (between the point B and the point D), the difference $\Delta$ between a set target steering angle $\gamma_0$ of the front wheels 11a and a detected steering angle $\gamma$ of the front wheels 11a, which is detected by the steering angle detector 62 ($=\gamma_0-\gamma$), becomes large and exceeds a predetermined threshold $\delta$, thus during this period a traveling speed S of the vehicle 10 is regulated (forcibly reduced) to a predetermined speed S' or lower. It should be noted that, in this example, after the vehicle 10 is shifted to the left rotation movement and the detected steering angle $\gamma$ approaches the target steering angle $\gamma_0$ so that the difference $\Delta$ between the target steering angle $\gamma_0$ and the detected steering angle $\gamma$ becomes smaller than the threshold $\delta$ (after the point D), the traveling speed S of the vehicle 10 is raised (increased) so that the traveling speed S of the vehicle 10 returns to an original traveling speed $S_0$ which is set in accordance with the amount of operation of the travel stop operation lever 41.

FIG. 8 is an example in which the left rotation movement is changed to a right rotation movement (a case in which the direction of the left rotation movement is inverted). Here, the steering dial 42 is twisted to the right significantly during the right rotation movement (between the point A and the point B. Although the dial 42 is twisted to the left significantly from the neutral position thereof during the period of these points, the actual steering angle is conformed with this period, thus the difference $\Delta$ between the target steering angle and the actual steering angle is substantially 0) so that the steering dial 42 exceeds the neutral position thereof significantly and is positioned to the right. However, during the period in which the steering angle of the front wheel 11a actually becomes a steering angle corresponding to the right rotation immediately after operating the steering dial 42 (between the point B and the point F), the difference $\Delta$ between the set target steering angle $\gamma_0$ of the front wheels 11a and the detected steering angle $\gamma$ of the front wheels 11a, which is detected by the steering angle detector 62 ($=\gamma_0-\gamma$), becomes large and exceeds the predetermined threshold $\delta$, thus during this period the traveling speed S of the vehicle 10 is regulated (forcibly reduced) to the predetermined speed S' or lower. It should be noted that, in this example as well, after the vehicle 10 is shifted to the right rotation movement and the detected steering angle $\gamma$ approaches the target steering angle $\gamma_0$ so that the difference $\Delta$ between the target steering angle $\gamma_0$ and the detected steering angle $\gamma$ becomes smaller than the threshold $\delta$ (after the point F), the traveling speed S of the vehicle 10 is raised (increased) so that the traveling speed S of the vehicle 10 returns to the original traveling speed $S_0$ which is set in accordance with the amount of operation of the travel stop operation lever 41.

Figure 9A:
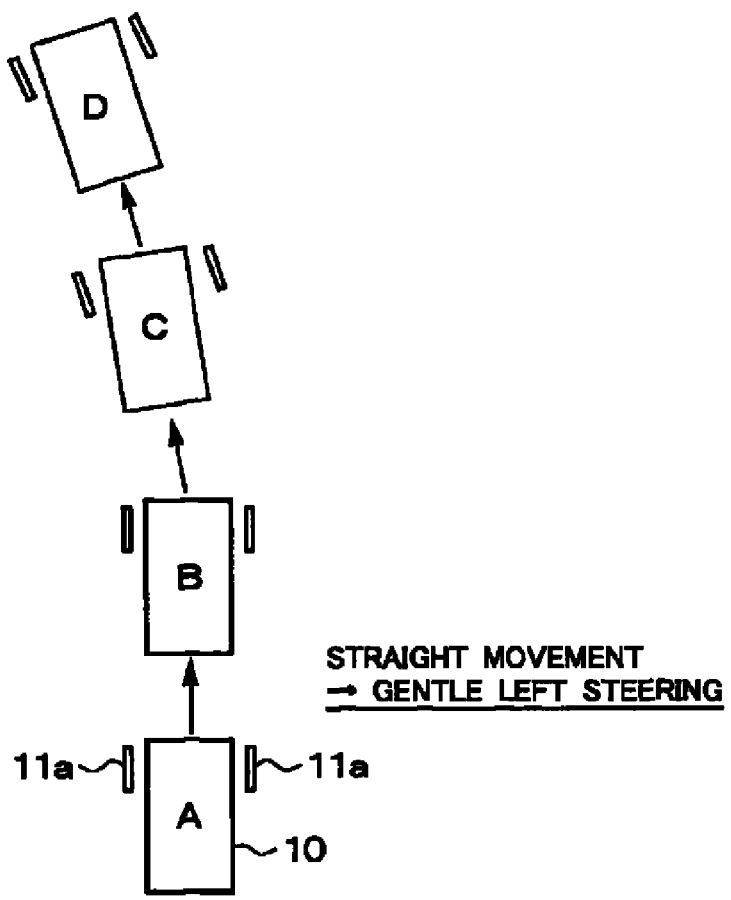
FIG. 9(A) shows a movement trajectory of the vehicle when the elevating work vehicle is shifted from the straight movement to a gentle left steering movement.
Figure 9B:
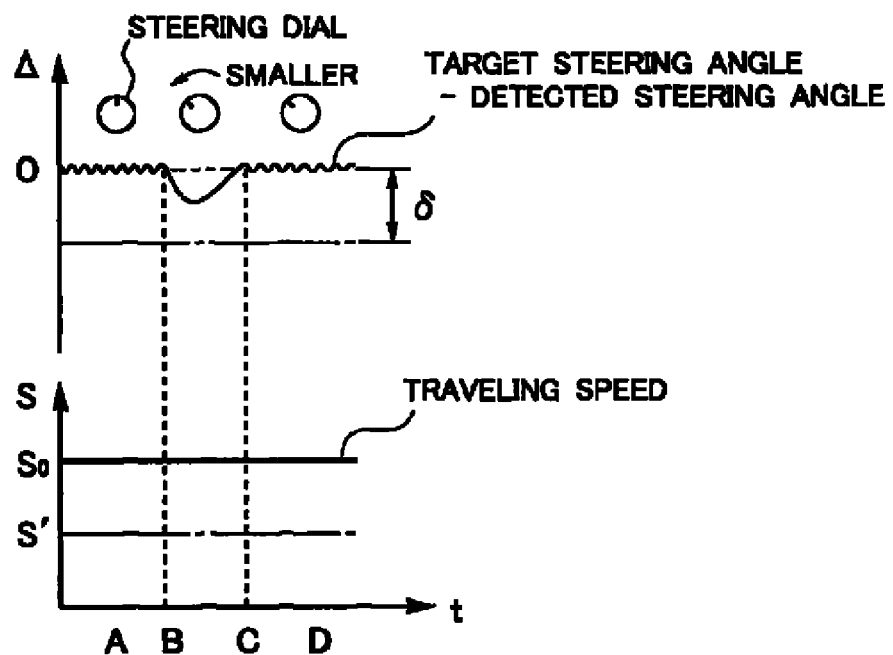
FIG. 9(B) shows a graph (top) showing the time variation of the difference Δ between the target steering angle and the detected steering angle, and a graph (bottom) showing the time variation of traveling speed, both graphs being related to FIG. 9(A)

FIG. 9 shows an example of a case in which the straight movement is changed to a gentle left steering movement and a case in which the traveling speed of the vehicle 10 is not regulated although the steering dial 42 is operated. Here, the steering dial 42 is twisted slightly to the left during a straight movement of the vehicle 10 (between the point A and the point B. The target steering angle and the actual steering angle are both 0 degree during the period of these points, and the difference $\Delta$ between these angles is substantially 0). However, during the period in which the steering angle of the front wheel 11a actually becomes a steering angle corresponding to the left rotation immediately after operating the steering dial 42 (between the point B and the point D), the difference $\Delta$ between the set target steering angle $\gamma_0$ of the front wheels 11a and the detected steering angle $\gamma$ of the front wheels 11a, which is detected by the steering angle detector 62 ($=\gamma_0-\gamma$), does not exceed the predetermined threshold 6, thus the traveling speed of the vehicle 10 is not regulated. In this manner, since the traveling speed is not particularly regulated when the steering dial 42 is slightly twisted from the neutral position thereof (corresponding to a straight movement of the vehicle 10) (when the target steering angle is small). Therefore, even when the steering dial 42 is caused to reciprocate with reference to the neutral position thereof (even during the slalom movement), the vehicle 10 can be caused to travel without its traveling speed being reduced forcibly.

It should be noted that although the above-described regulation of the traveling speed is carried out when the steering wheels, i.e. the right and left front wheels 11a, are steered to either the right or the left from the straight direction (neutral position), the regulation of the traveling speed may not be carried out when returning to the straight direction (neutral position) from the state in which the steering wheels are steered to the right or the left.

The second embodiment of the travel control apparatus according to the present invention is described next. In the travel control apparatus according to the second embodiment, the controller 50 detects (calculates) the operation speed of the steering dial 42 (change amount of an operation per unit time) on the basis of an output from the steering operation detector 42a. When thus obtained operation speed of the steering dial 42 is at least a predetermined value which is previously set, thereafter the traveling speed of the vehicle 10 is regulated so that the traveling speed of the vehicle 10 becomes predetermined speed or lower during a fixed period of time (during a period in which the difference between the target steering angle $\gamma_0$ and the detected steering angle $\gamma$ becomes the predetermined value or lower. Alternatively, the fixed period may be based on other period).

As a method of regulating the traveling speed as described above, there is a control method for previously setting a predetermined speed and reducing the traveling speed of the vehicle to this predetermined speed if the vehicle travels at higher than the predetermined speed, and a speed regulation control method for previously setting a deceleration which is increased as the operation speed of the steering dial 42 increases, and obtaining a predetermined speed by reducing the traveling speed based on this set deceleration.

Figure 10A:
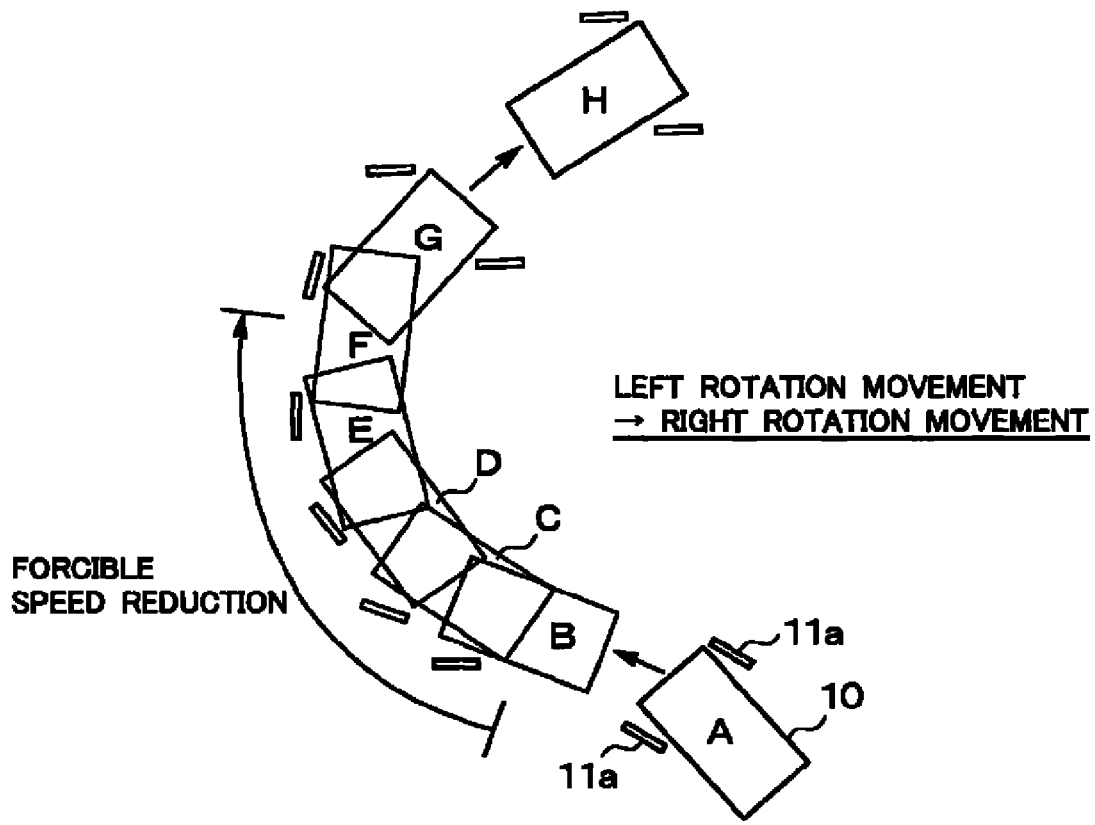
FIG. 10(A) shows a movement trajectory of the vehicle when the elevating work vehicle is shifted from the left rotation movement to the right rotation movement in a second embodiment of the present invention.
Figure 10B:
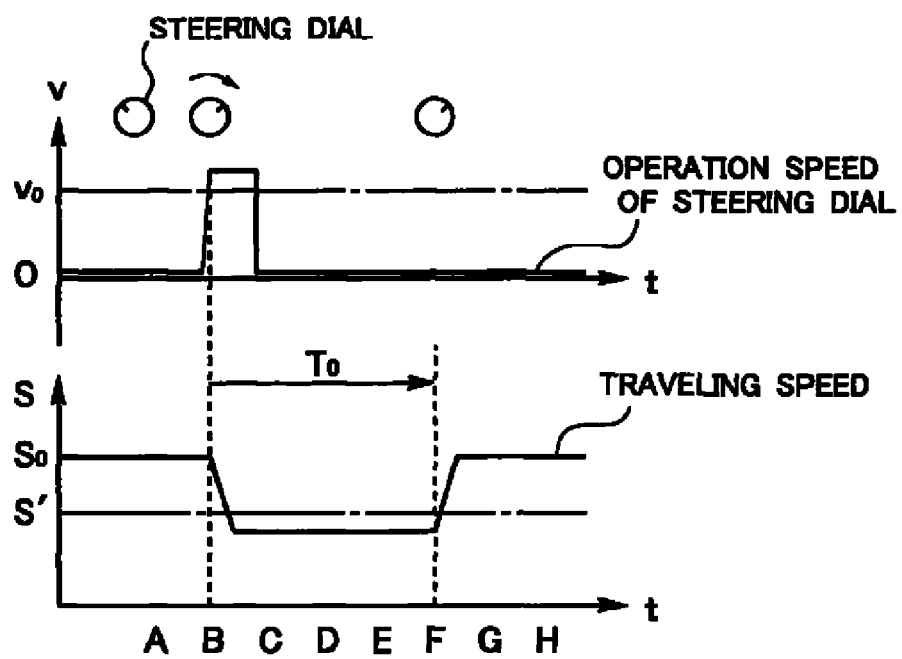
FIG. 10(B) shows a graph (top) showing the time variation of the operation speed v of a steering dial, and a graph (bottom) showing the time variation of traveling speed, both graphs being related to FIG. 10(A)

In this travel control apparatus according to the second embodiment, as shown in FIG. 10, for example, there is considered a case in which the steering dial 42 is twisted immediately to the right to shift the movement of the vehicle 10 from the left rotation movement to the right rotation movement during the left rotation movement (between the point A and the point B. During this period the steering dial 42 is stopped after being twisted to the left from the neutral position thereof) (a case in which the direction of the rotating movement is inverted). In this case, when the operation speed v of the steering dial 42 is at least a predetermined value $v_0$ (the point B), the traveling speed S of the vehicle 10 is reduced (forcibly reduced) to the predetermined speed S' or lower, and thereafter the reduced speed is held for a fixed period of time $T_0$ (between the point B and the point F). Then, after the operation speed v of the steering dial 42 becomes the predetermined value $v_0$ or higher and the fixed period of time $T_0$ is elapsed (after the point F), the traveling speed S of the vehicle 10 is raised (increased) so that the traveling speed S of the vehicle 10 returns to the original traveling speed $S_0$ which is set in accordance with the amount of operation of the travel stop operation lever 41. Here, setting of the time $T_0$ during which the traveling speed of the vehicle 10 is constantly regulated is optional, but it is preferred that the time $T_0$ be set to a value in anticipation of the time during which the steering cylinder 17 is actuated so that the detected steering angle $\gamma$ of the front wheels 11a is conformed with the target steering angle $\gamma_0$ which is set by operating the steering dial 42.

In this manner, in the travel control apparatus according to the second embodiment, the steering dial 42 is operated immediately (at this moment the difference between the target steering angle $\gamma_0$ of the front wheels 11a and the detected steering angle $\gamma$ of the front wheels 11a increases), and the traveling speed S of the vehicle 10 is regulated to the predetermined speed S' or lower (forcibly reduced depending on the traveling speed before steering is performed) when the operation speed v of the steering dial 42, which is calculated by the controller 50, becomes at least the predetermined value $v_0$. Therefore, when the rotating movement is inverted, the traveling speed is kept low during the period in which the actual steering angle (detected steering angle $\gamma$) of the front wheels 11a is not sufficiently conformed with the target steering angle $\gamma_0$. For this reason, the effects same as those in the travel control apparatus for a vehicle according to the first embodiment can be obtained.

In this embodiment as well, the above-described regulation of the traveling speed is carried out in the case of steering the steering wheels, i.e. the right and left front wheels 11a, to either the right or the left from the straight direction (neutral position), but the regulation of the traveling speed may not be carried out when returning to the straight direction (neutral position) from the state in which the steering wheels are steered to the right or the left.

Figure 11:
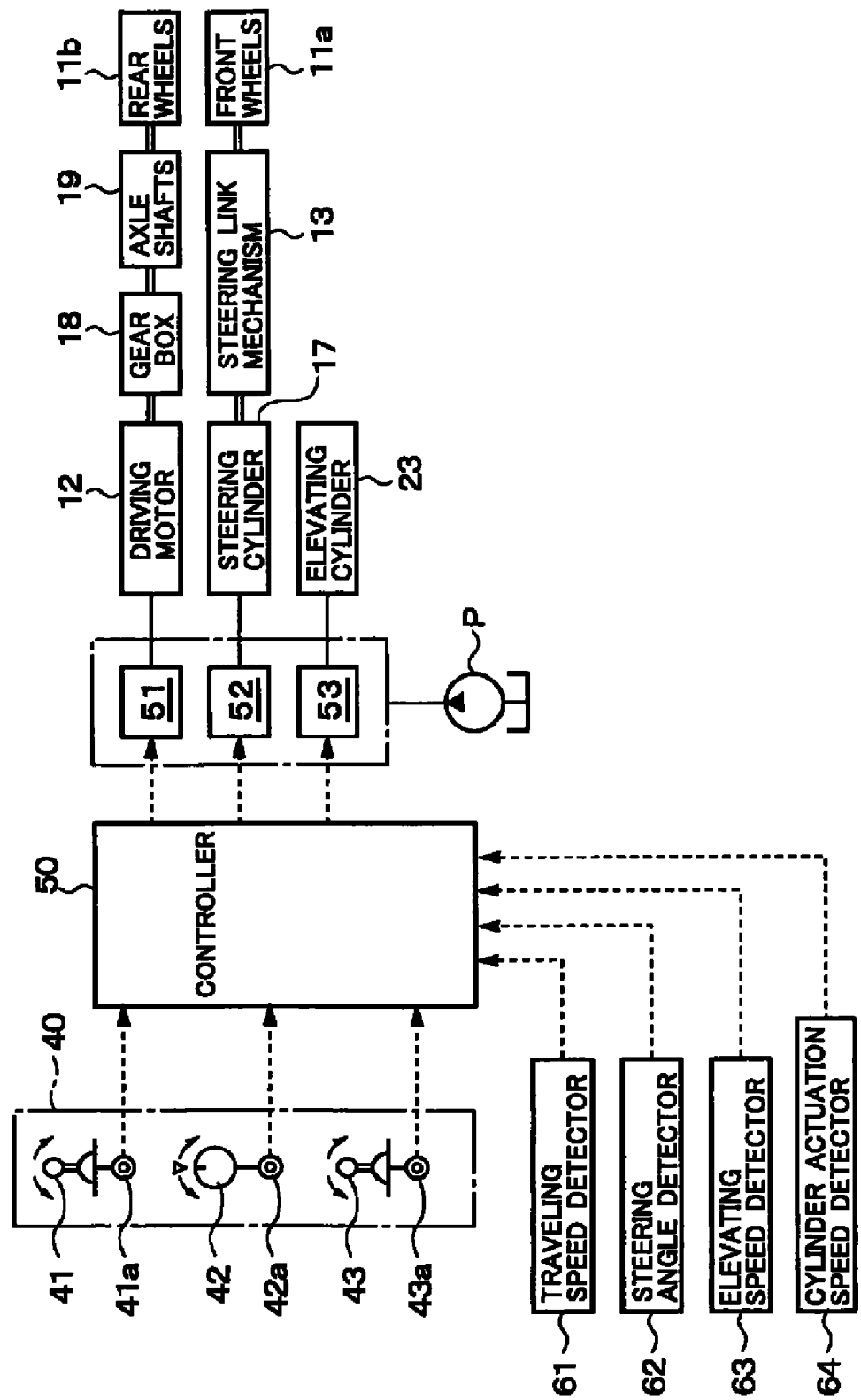
FIG. 11 is a block diagram showing the communication channel for a signal and mechanical force in relation to an elevation movement of the travel operation and the work table of the vehicle in the elevating work vehicle which comprises a travel control apparatus for a vehicle, according to the second embodiment of the present invention.

The third embodiment of the travel control apparatus according to the present invention is described next. The travel control apparatus according to the third embodiment comprises a cylinder actuation speed detector 64 which detects actuation speed of the steering cylinder 17 (see FIG. 11), and is configured such that, when the actuation speed of the steering cylinder 17, which is detected by the cylinder actuation speed detector 64, is at least a predetermined value, the controller 50 regulates the traveling speed of the vehicle 10 so that the traveling speed of the vehicle 10 becomes predetermined speed or lower. Here, the cylinder actuations speed detector 64 does not necessarily detect the actuation speed of the steering cylinder 17 directly, and thus may detect the physical amount which is proportional to the actuation speed of the steering cylinder 17 (for example, the flow rate of the pressure oil flowing into the steering cylinder 17 per unit time, or the amount of drive of the spool of the operation control valve 52 (or the size of a driving signal of the spool)).

Figure 12A:
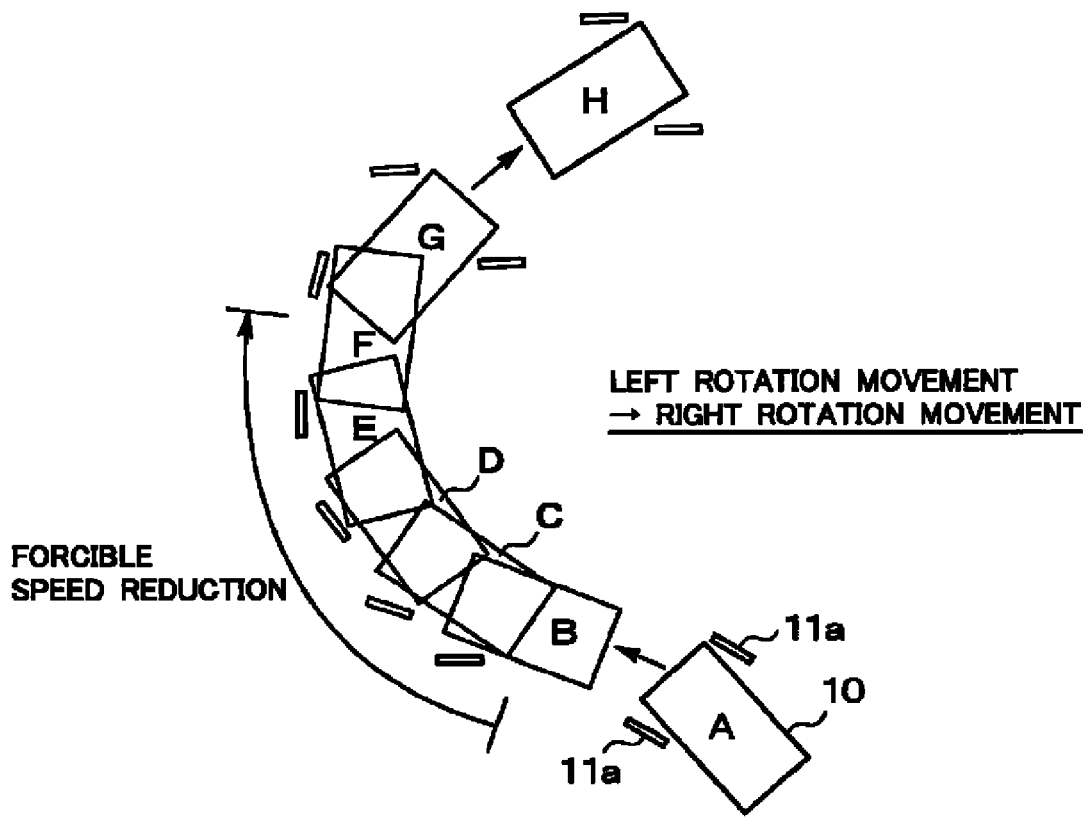
FIG. 12(A) shows a movement trajectory of the vehicle when the elevating work vehicle is shifted from the left rotation movement to the right rotation movement in a third embodiment of the present invention.
Figure 12B:
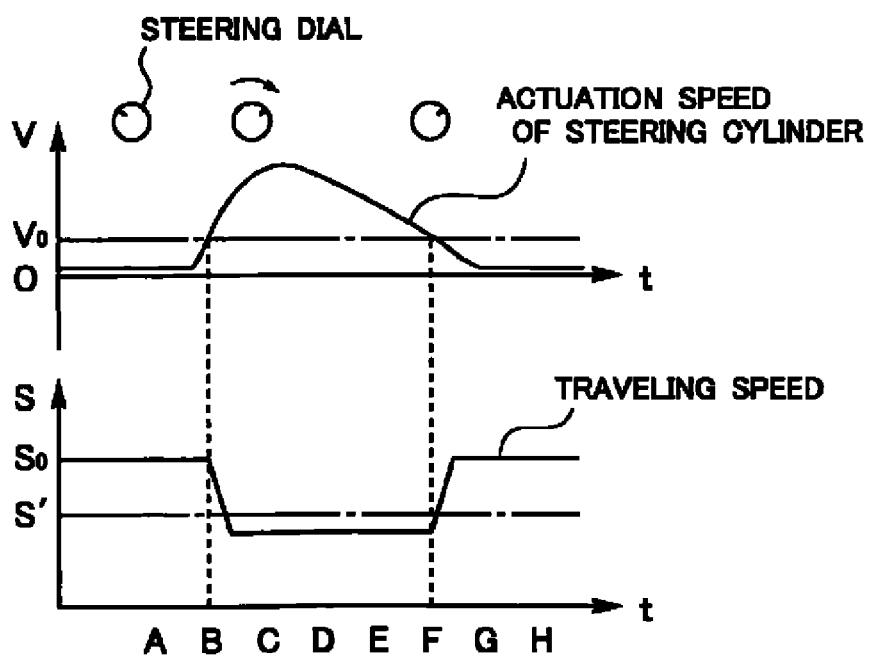
FIG. 12(B) shows a graph (top) showing the time variation of the actuation speed V of the steering cylinder, and a graph (bottom) showing the time variation of traveling speed, both graphs being related to FIG. 12(A)

In this travel control apparatus according to the third embodiment, as shown in FIG. 12, for example, there is considered a case in which the steering dial 42 is twisted immediately to the right to shift the movement of the vehicle 10 from the left rotation movement to the right rotation movement during the left rotation movement (between the point A and the point B. During this period the steering dial 42 is stopped after being twisted to the left from the neutral position thereof) (a case in which the direction of the rotating movement is inverted). In this case, when the actuation speed V of the steering cylinder 17 is at least a predetermined value $V_0$ (the point B), the traveling speed S of the vehicle 10 is reduced (forcibly reduced) to the predetermined speed S' or lower, and thereafter, during the period in which the actuation speed V of the steering cylinder 17 is at least the predetermined value $V_0$, the reduced speed is held (between the point B and the point F). Then, after the actuation speed V of the steering cylinder 17 falls below the predetermined value $V_0$ (after the point F), the traveling speed S of the vehicle 10 is raised (increased) so that the traveling speed S of the vehicle 10 returns to the original traveling speed $S_0$ which is set in accordance with the amount of operation of the travel stop operation lever 41. It should be noted that, as shown in FIG. 12, the reason that the steering cylinder 17 is actuated at large actuation speed immediately after the steering dial 42 is operated immediately (the reason that the actuation speed of the steering cylinder 17 is increased rapidly) is because the difference between the target steering angle $\gamma_0$ of the front wheels 11a and the detected steering angle $\gamma$ of the front wheels 11a is increased by the rapid operation of the steering dial 42 and the steering cylinder 17 tries to conform the detected steering angle $\gamma$ with the target steering angle $\gamma_0$ as soon as possible.

It should be noted that, as a method of regulating the traveling speed as described above, there is a control method for previously setting a predetermined speed and reducing the traveling speed of the vehicle to this predetermined speed if the vehicle travels at higher than the predetermined speed, and a speed regulation control method for previously setting a deceleration which is increased as the actuation speed V of the steering cylinder 17 increases, and obtaining a predetermined speed by reducing the traveling speed based on this set deceleration.

In this manner, in the travel control apparatus according to the third embodiment, the steering dial 42 is operated immediately (at this moment the difference between the target steering angle $\gamma_0$ of the front wheels 11a and the detected steering angle $\gamma$ of the front wheels 11a increases), and the traveling speed S of the vehicle 10 is regulated to the predetermined speed S' or lower (forcibly reduced depending on the traveling speed before steering is performed) during the period in which the actuation speed V of the steering cylinder 17 is at least the predetermined value $V_0$, when the actuation speed V of the steering cylinder 17 is at least the predetermined value $V_0$ so as to conform the detected steering angle $\gamma$ of the front wheels 11a with the target steering angle $\gamma_0$. Therefore, when the rotating movement is inverted, the traveling speed is kept low during the period in which the actual steering angle (detected steering angle $\gamma$) of the front wheels 11a is not sufficiently conformed with the target steering angle $\gamma_0$. For this reason, the effects same as those in the travel control apparatus for a vehicle according to the first embodiment can be obtained.

In this embodiment as well, the above-described regulation of the traveling speed is carried out in the case of steering the steering wheels, i.e. the right and left front wheels 11a, to either the right or the left from the straight direction (neutral position), but the regulation of the traveling speed may not be carried out when returning to the straight direction (neutral position) from the state in which the steering wheels are steered to the right or the left.

Figure 13A:
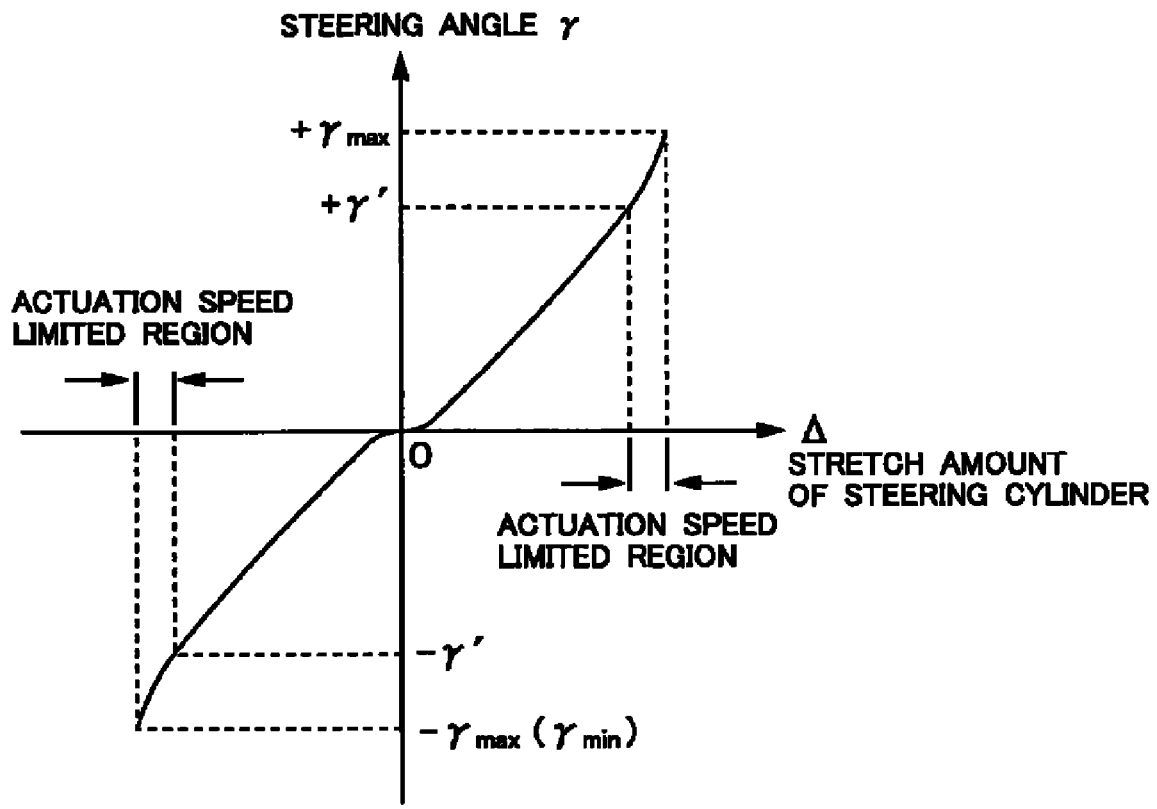
FIG. 13(A) is a graph showing the relationship between a stretch amount Δ and a steering angle γ when the length of the steering cylinder is a reference amount (stretch amount Δ=0) and when the steering angle of the front wheels in the elevating work vehicle is 0 (γ=0)

The above has described the control of the traveling speed which involves the steering operation, but the control of steering speed which involves the steering operation is described hereinafter. FIG. 13(A) is a graph showing the relationship between a stretch amount $\Delta$ of the steering cylinder 17 and a steering angle $\gamma$ of the front wheels 11a ($\gamma$>0 at the time of right direction steering) when the length of the steering cylinder 17 is a reference amount and when the steering angle $\gamma$ of the front wheels 11a is 0 ($\gamma$=0). As described above, in the steering link mechanism 13 according to the present embodiment, the symbol for the steering angle $\gamma$ is positive ($\gamma$>0) when the stretch amount $\Delta$ of the steering cylinder 17 is a positive value, and the symbol for the steering angle $\gamma$ is negative ($\gamma$<0) when the stretch amount $\Delta$ of same is a negative value. As can be seen from this graph, the change amount of the steering angle $\gamma$ with respect to the change amount of the length of the steering cylinder 17 (stretch amount $\Delta$)is not always constant regardless of the size of the steering angle $\gamma$, thus when the size of the steering angle $\gamma$ (absolute value) exceeds a certain reference amount $\gamma'$, the change amount of the steering angle $\gamma$ with respect to the change amount of the change amount of the length of the steering cylinder 17 (stretch amount $\Delta$) increases drastically. It means that if the actuation speed of the steering cylinder 17 is constant, the speed of a change of the steering angle $\gamma$ is larger in a steering region in which the size of the steering angle $\gamma$ is larger than the reference amount $\gamma'$ (a region where $\gamma$>$\gamma'$ or $\gamma$<−$\gamma'$), than in a steering region in which the size of the steering angle $\gamma$ is equal to or smaller than the reference amount $\gamma'$ (a region where −$\gamma'$≦$\gamma$≦$\gamma'$), thus in the steering region in which the steering angle $\gamma$ is larger than the reference amount $\gamma'$, the it is difficult to cause the front wheels 11a to stop at the position of the target steering angle.

Figure 14:
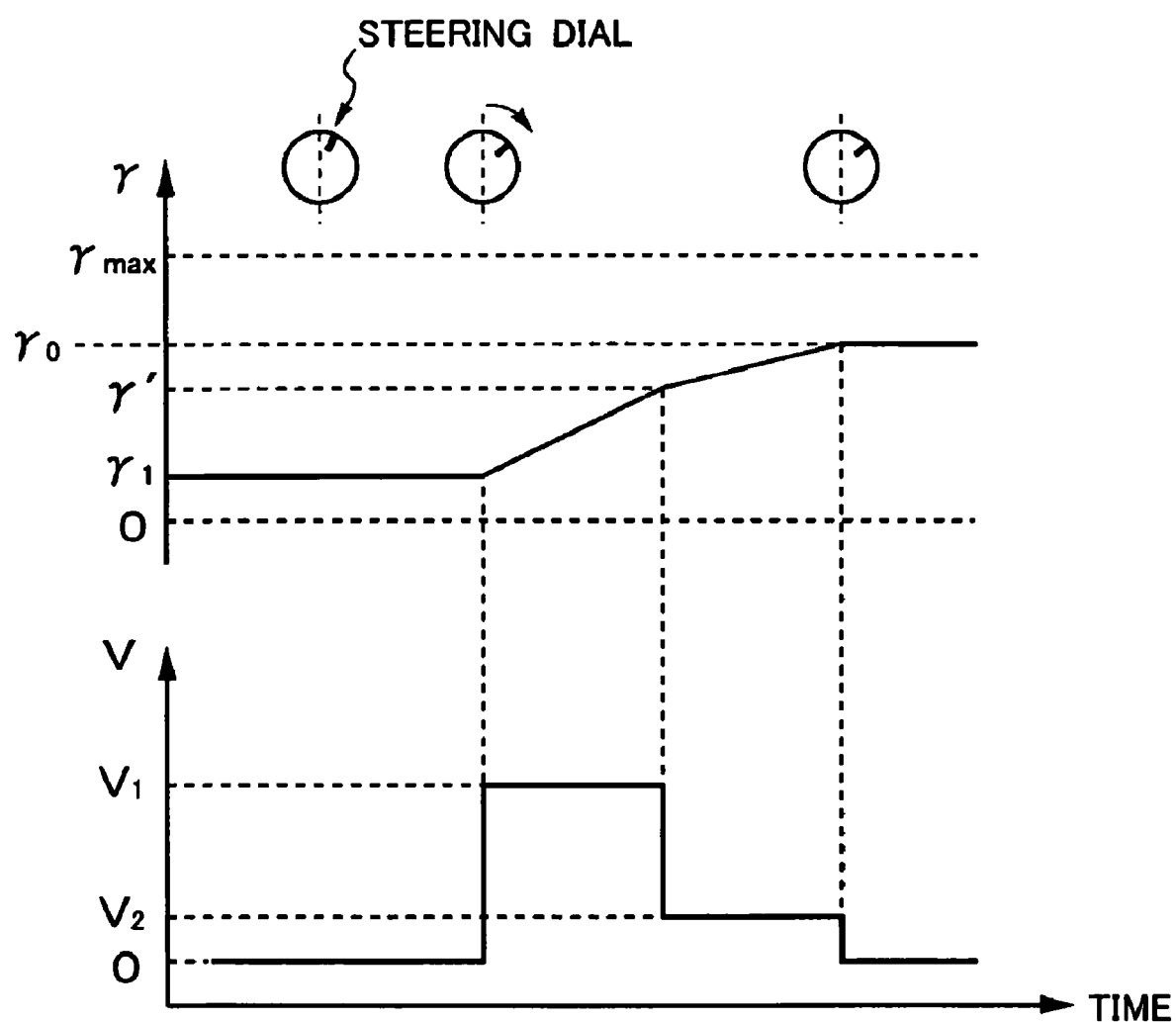
FIG. 14 shows a graph (top) showing changes in the steering angle with respect to time when the target steering angle larger than the reference amount is set from a state of the steering angle which is smaller than the reference amount, and a graph (bottom) showing changes in the actuation speed of the steering cylinder with respect to time.
Figure 15:
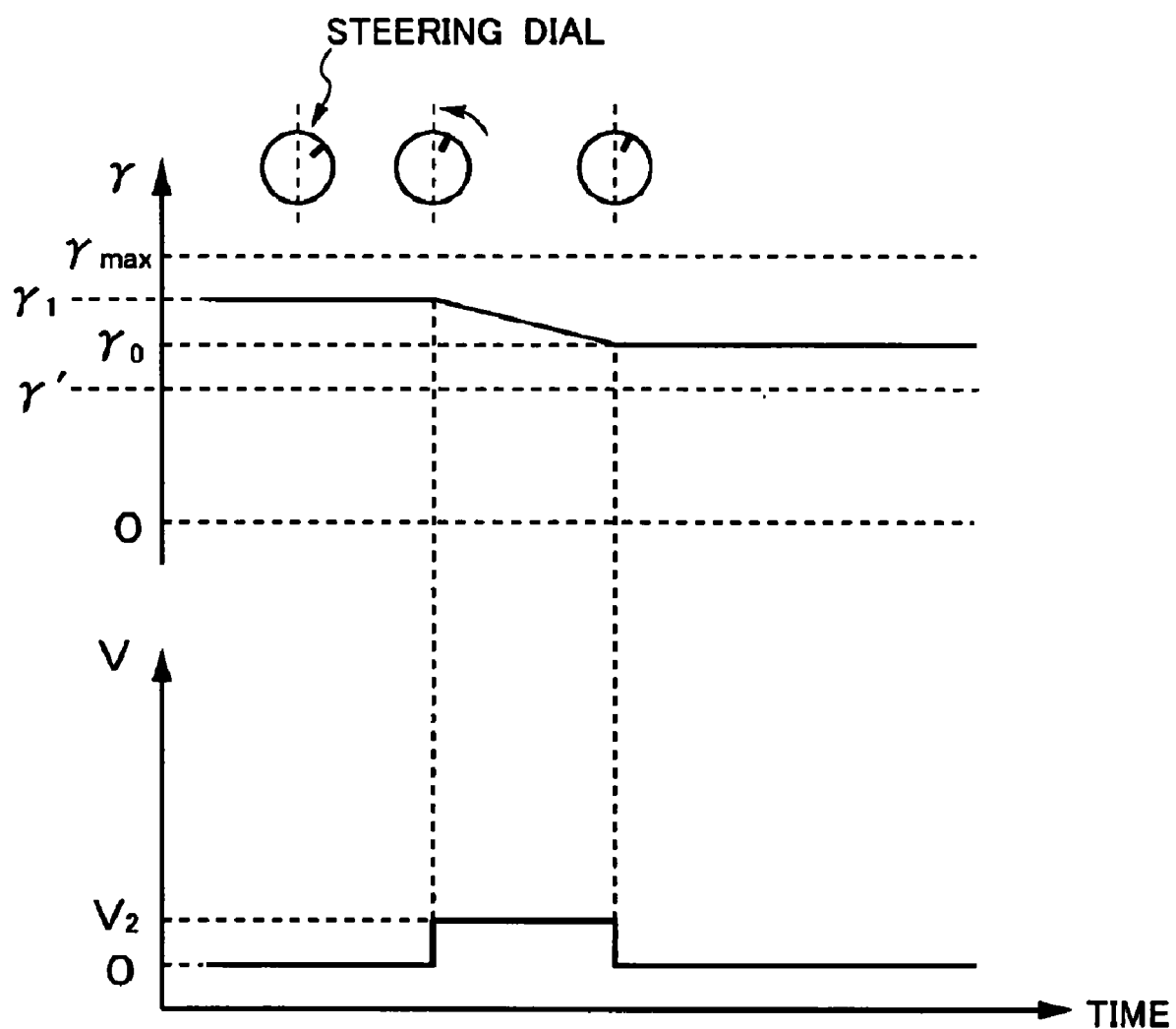
FIG. 15 shows a graph (top) showing changes in the steering angle with respect to time when the target steering angle larger than the reference amount is set from a state of the steering angle which is smaller than the reference amount, and a graph (bottom) showing changes in the actuation speed of the steering cylinder with respect to time.

For this reason, in the steering apparatus provided in the elevating work vehicle 1, the controller 50 calculates the size (absolute value) of the steering angle $\gamma$ of the front wheels 11a on the basis of the detection information from the steering angle detector 62. The steering cylinder 17 is actuated at a first actuation speed V1 when the steering angle $\gamma$ is within the steering region in which the steering angle $\gamma$ is equal to or smaller than the predefined reference amount $\gamma'$ (the region where −$\gamma'$≦$\gamma$≦$\gamma'$ in FIG. 13(A)). The steering cylinder 17 is actuated at a second actuation speed V2, which is lower than the first actuation speed V1, when the steering angle $\gamma$ is within the steering region in which the steering angle $\gamma$ exceeds the reference amount $\gamma'$ (the region where $\gamma$>$\gamma'$ or $\gamma$<−$\gamma'$ in FIG. 13(A)) (see FIG. 13(B)). For example, as shown in FIG. 14, when the steering dial 42 is twisted to the right to set a target steering angle $\gamma_0$, which is larger than the reference amount $\gamma'$, from the state in which a steering angle $\gamma_1$ (>0) is smaller than the reference amount $\gamma'$, the steering cylinder 17 is first actuated at the actuation speed V1 (stretched), but after the steering angle $\gamma$ reaches the reference amount $\gamma'$, the actuation speed V of the steering cylinder 17 is limited to the actuation speed V2 which is lower than V1. It should be noted that such limitation of the actuation speed of the steering cylinder 17 is carried out by, for example, the controller 50 reducing the drive amount of the spool of the steering control valve 52. Moreover, as shown in FIG. 15, when the steering dial 42 is twisted to the left to set the target steering angle $\gamma_0$, which is larger than the reference amount $\gamma'$, from the state in which the steering angle $\gamma_1$ (>0) is larger than the reference amount $\gamma'$, the steering cylinder 17 is actuated at the limited actuation speed V2 from the beginning to the end. It should be noted that FIG. 13(B) shows the magnitude of the actuation speed V of the steering cylinder 17 with respect to the steering angle $\gamma$, wherein when the steering cylinder 17 is stretched, the actuation speed V means stretch actuation speed of the steering cylinder 17, and when the steering cylinder 17 is contracted, the actuation speed V means contraction actuation speed of the steering cylinder 17.

Figure 13B:
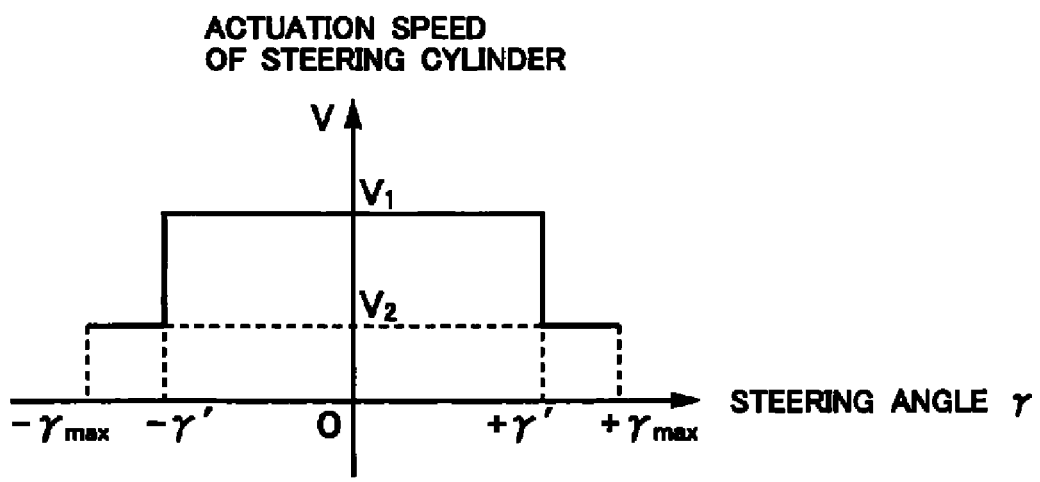
FIG. 13(B) is a graph showing the actuation speed of the steering cylinder with respect to the steering angle of the front wheels.
Figure 16:
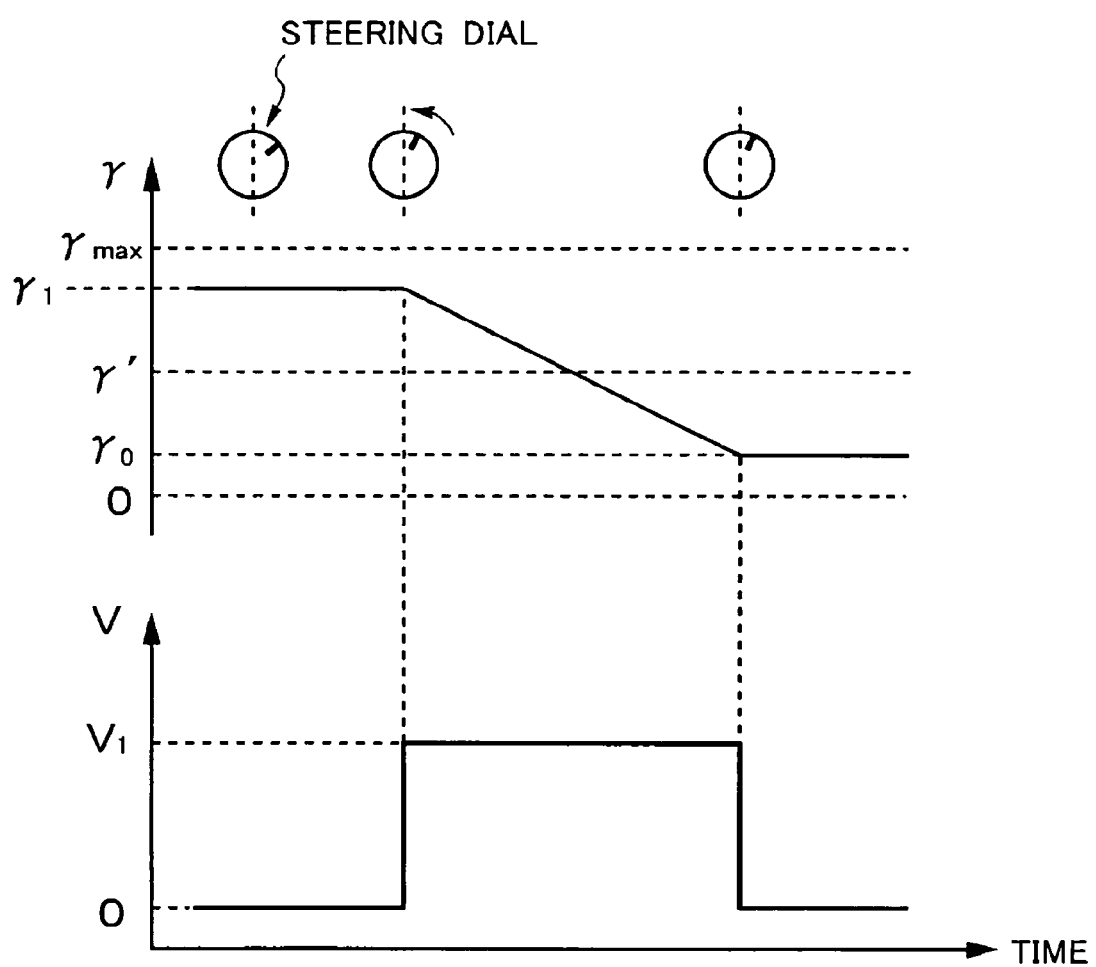
FIG. 16 shows a graph (top) showing change in the steering angle with respect to time when the target steering angle larger than the reference amount is set from a state of the steering angle which is smaller than the reference amount, and a graph (bottom) showing changes in the actuation speed of the steering cylinder with respect to time.

On the other hand, the controller 50 actuates the steering cylinder 17 without limiting the actuation speed of the steering cylinder 17 to the speed V2 (actuates the steering cylinder 17 at the same actuation speed V1 as with the case where the size of the steering angle $\gamma$ of the front wheels 11a is equal to or less than the reference amount $\gamma'$), even during the period in which the size of the steering angle $\gamma$ of the front wheels 11a exceeds the reference amount $\gamma'$, when the target steering angle $\gamma_0$ is set so that the size of the steering angle $\gamma$ becomes equal to or smaller than the reference amount $\gamma'$ from a state in which the size of the steering angle $\gamma$ (absolute value) of the steering wheels 11a, which is detected by the steering angle detector 62, exceeds the reference amount $\gamma'$ ($\gamma$>$\gamma'$ or $\gamma$<−$\gamma'$ in FIG. 13(A) and FIG. 13(B)). For example, as shown in FIG. 16, when the steering dial 42 is twisted to the left to set the target steering angle $\gamma_0$, which is smaller than the reference amount $\gamma'$, from the state in which the steering angle $\gamma_1$ (>0) is larger than the reference amount $\gamma'$, the steering cylinder 17 is actuated at the limited actuation speed V1 from the beginning to the end.

As described above, in the steering apparatus provided in the elevating work vehicle 1, when the size of the steering angle $\gamma$ (absolute value) of the front wheels 11a which are the steering wheels exceeds the predefined reference amount $\gamma'$, the steering cylinder 17 is actuated at the actuation speed which is lower than that of the case in which the size of the steering angle γ of the front wheels 11a is equal to or lower than the reference amount γ'. Therefore, in the region in which the size of the steering angle γ of the front wheels 11a exceeds the reference amount γ' and the change amount of the steering angle γ of the front wheels 11a with respect to the change amount of the length of the steering cylinder 17 (change amount of the stretch amount Δ) increases (the region in which the size of the steering angle γ of the front wheels 11a exceeds the reference amount γ'), the front wheels 11a can be caused to stop accurately at the position of the target steering angle.

Moreover, in this steering apparatus, when the target steering angle $γ_O$ is set so that the size of the steering angle γ becomes equal to or smaller than the reference amount Δ' from a state in which the size of the steering angle γ (absolute value) of the steering wheels 11a exceeds the reference amount γ', even if the size of the steering angle γ exceeds the reference amount γ', the steering cylinder 17 is actuated at the same actuation speed as with the case where the size of the steering angle γ is equal to or less than the reference amount Δ'. Therefore, until the size of the steering angle γ becomes equal to or less than the reference amount γ', the actuation speed of the steering cylinder 17 is not limited unnecessarily, thus actuation delay of the front wheels 11a in a steering operation can be eliminated.

Figure 17:
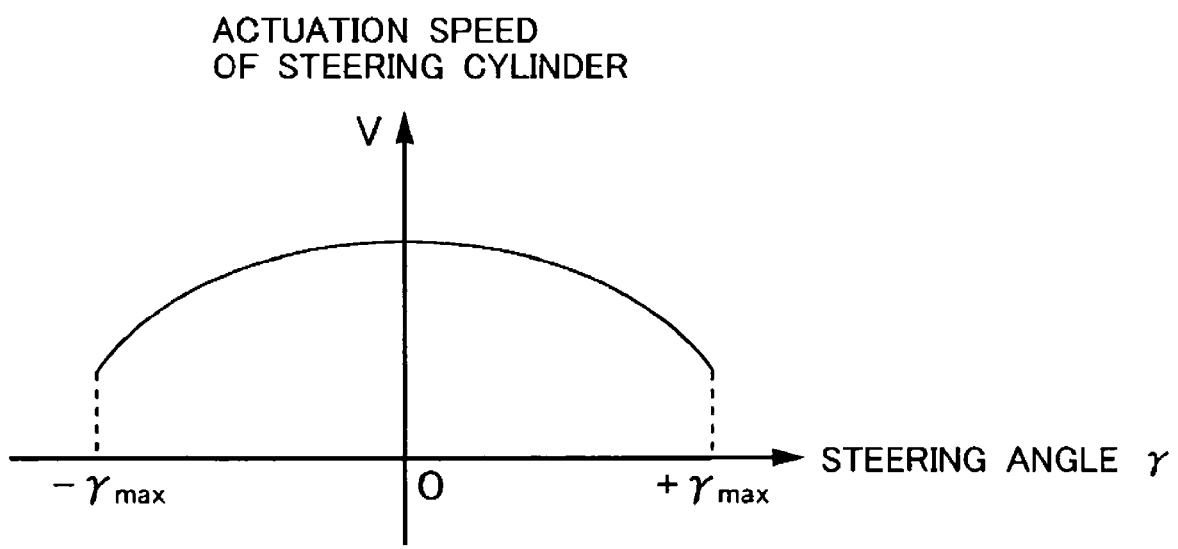
FIG. 17 is a graph showing the actuation speed of the steering cylinder with respect to the steering angle of the front wheels when the larger the steering angle of the front wheels as a steering wheel, the slower the actuation speed to actuate the steering cylinder.

Further, in the steering apparatus according to the present invention, instead of actuating the steering cylinder 17 at the first actuation speed (V1) when the size of the steering angle γ is equal to or lower than the predefined reference amount, and actuating the steering cylinder 17 at the second actuation speed (V2), which is lower than the first actuation speed, when the size of the steering angle γ exceeds the predefined reference amount, a plurality of reference amounts may be provided to determine the actuation speed for actuating the steering actuator in response to each of the reference amounts. Alternatively, the larger the steering angle γ of the front wheels 11a which are the steering wheels, the lower the actuation speed for actuating the steering cylinder 17 (see FIG. 17). Even in such configurations, in the region in which the change amount of the steering angle γ of the front wheels 11a with respect to the actuation amount of the steering cylinder 17 increases (the region in which the size of the steering angle γ of the front wheels 11a is large), the front wheels 11a can be caused to stop accurately at the position of the target steering angle.

Next, a configuration and operation of the above steering apparatus for steering the front wheels 11a, i.e. the steering wheels, in response to an operation of the steering dial 42 are described in detail.

The front wheels 11a, which are the steering wheels, and the steering dial 42 are engaged and connected with each other via the steering apparatus. The steering apparatus comprises a steering mechanism 13 which is linked to the front wheels 11a, the steering cylinder (hydraulic cylinder) 17 which drives this steering mechanism 13 to change a steering angle γ of the front wheels 11a (deflection angle of the front wheels 11a with respect to the front and rear central axes of the vehicle 10, see FIG. 18.), the steering angle detector 62 which is attached to one of the pair of right and left front wheels 11a and detects a steering angle of the front wheels 11a, the steering dial 42 which sets a target steering angle of the front wheel 11a to which the steering angle detector 62 is attached, and the controller 50 which actuates and controls the steering cylinder 17 in response to an operation of the steering dial 42.

As shown in FIG. 3, the steering mechanism 13 comprises a pair of knuckle arms 14 which swingably support the front wheels ha around the kingpin axes 15, and the tie rod 16 which connects the pair of knuckle arms 14 by means of the connecting pin P1. The steering angle detector 62 is attached to the left knuckle arm 14 and detects a steering angle of the left front wheel 11a from the angle of rotation around the left kingpin axis 15. One end section of the steering cylinder 17 is connected the left knuckle arm 14 configuring the steering mechanism 13, via the connecting pin P2, and other end of the steering cylinder 17 is connected to the cylinder connecting section not shown of the vehicle 10 via the connecting pin P3.

Therefore, in the steering apparatus according to the present invention, by causing the steering cylinder 17 to perform an expansion operation, the left front wheel 11a can be caused to swing around the kingpin axis 15, the right front wheel 11a can be caused to swing via the tie rod 16 simultaneously with the left front wheel 11a in the same direction, and the steering angle γ of the front wheels 11a (steering wheels) can be changed. Specifically, by causing the steering cylinder 17 to perform a stretch operation, the right and left front wheels 11a can be directed to the right, and by causing the steering cylinder 17 to perform a contraction operation, the right and left front wheels 11a can be directed to the left. At this moment, the pair of right and left front wheels 11a are set by the steering mechanism 13 so that the difference is generated in the steering angle when the vehicle 10 is rotated (so that the size of the steering angle of the inner wheels always becomes larger than the size of the steering angle of the outer wheels by a fixed ratio).

Figure 18A:
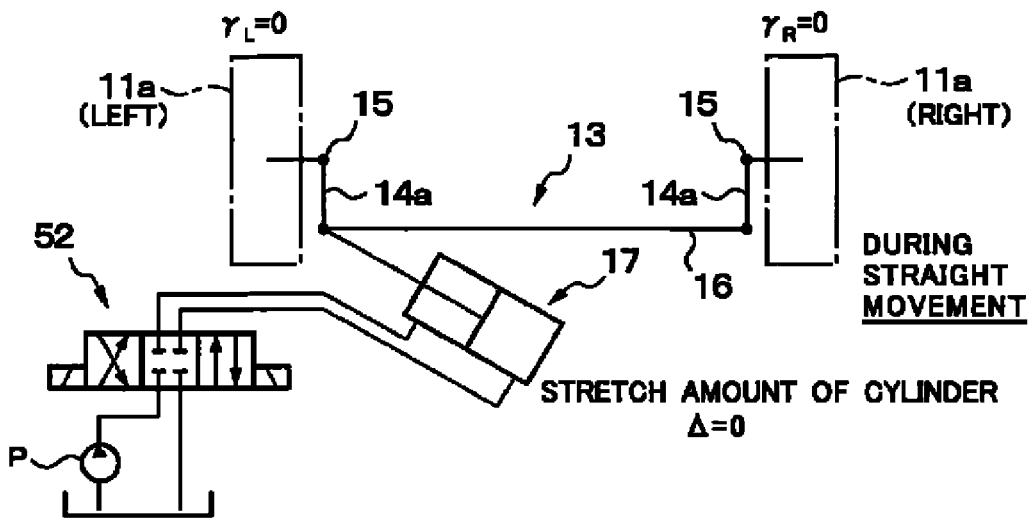
FIG. 18(A) shows a state in which the stretch amount of the steering cylinder is zero.
Figure 18B:
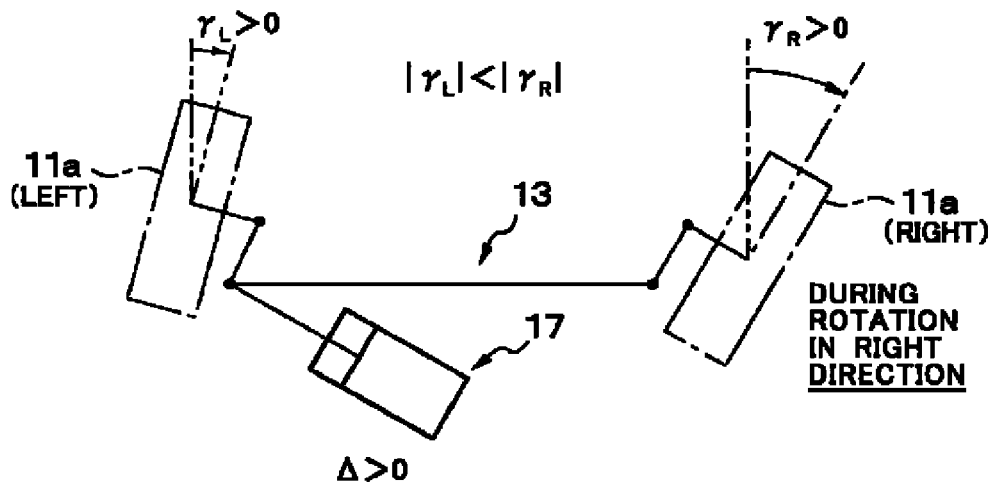
FIG. 18(B) shows a state in which the stretch amount of the steering cylinder is a positive value.
Figure 18C:
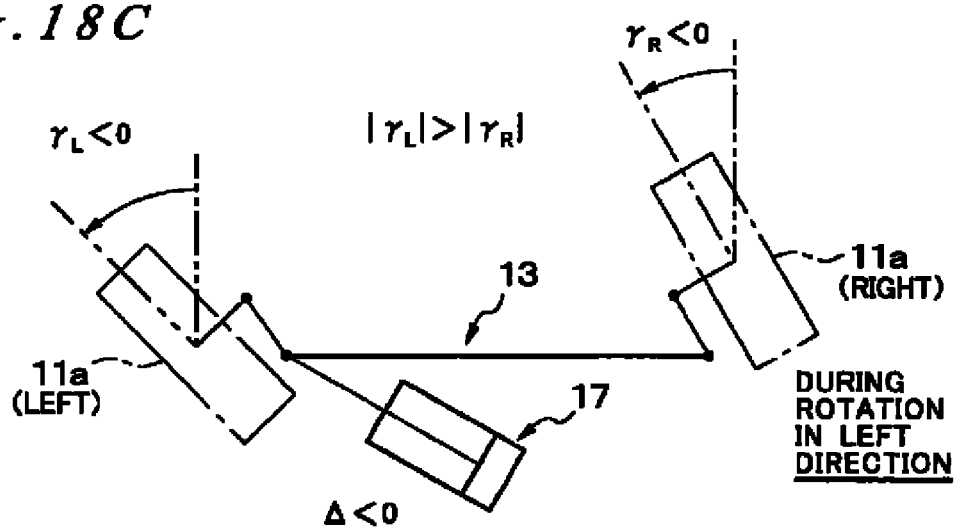
FIG. 18(C) shows a state in which the stretch amount of the steering cylinder is a negative value.

To describe with reference to FIG. 18, when the expansion amount Δ of the steering cylinder 17 is zero (Δ=0), the steering angles $γ_L$ and $γ_R$ of the right and left front wheels 11a are both zero ($γ_L$=0, $γ_R$=0) (see FIG. 18(A)). Further, suppose that the symbol for the steering angle is positive when the front wheels 11a are deflected in the right direction, and that the symbol for the steering angle is negative when the front wheels 11a are deflected to the left direction, when the stretch amount Δ is a positive value (Δ>0) the steering angles $γ_L$ and $γ_R$ of the right and left front wheels 11a are positive values ($γ_L$>0, $γ_R$>0) (see FIG. 18(B)). At this moment, although described hereinafter, the relationship between the steering angle $γ_L$ of the left front wheel 11a and the steering angle $γ_R$ of the right front wheel 11a is $|γ_L|<|γ_R|$ according to the characteristics of the steering mechanism 13. Moreover, when the stretch amount Δ is a negative value (Δ<0) the steering angles $γ_L$ and $γ_R$ of the right and left front wheels 11a are negative values ($Δ_L$<0, $γ_R$<0) (see FIG. 18(C)). At this moment, the relationship between the steering angle $γ_L$ of the left front wheel 11a and the steering angle $γ_R$ of the right front wheel 11a is $|γ_L|>|γ_R|$ according to the characteristics of the steering mechanism 13.

Figure 19:
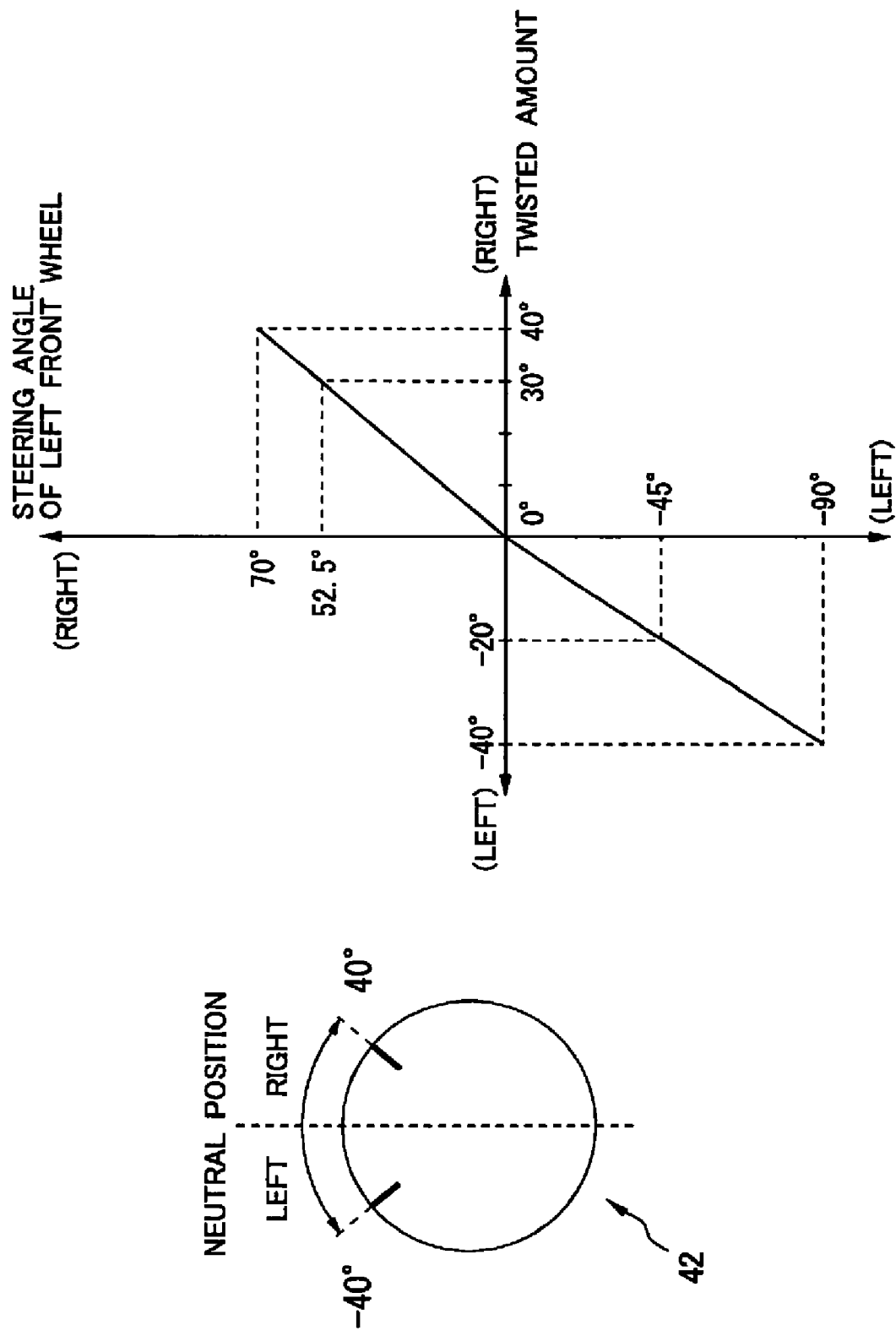
FIG. 19 is a figure showing the relationship between the maximum twisted amount of the operation dial and the steering angle of a left front wheel in the elevating work vehicle.

In the present embodiment, the maximum twisted amount of the steering dial 42 is set to 40 degrees clockwise and counterclockwise, as shown in FIG. 19, and the maximum steering angle of the left front wheel 11a is set to 90 degrees in the left direction and 70 degrees in the right direction, thus the operational state of the steering dial 42 and the target steering angle of the left front wheel 11a, which is the wheel used for detecting a steering angle, are in a proportional relationship. Moreover, as shown in FIG. 20, the maximum steering angle of the right front wheel 11a is set to 90 degrees in the right direction and 70 degrees in the left direction, and the right front wheel 11a is connected to the left front wheel 11a via the steering mechanism 13, thus the steering angle of the right front wheel 11a can be determined from (a detected value of) the steering angle of the left front wheel 11a.

Figure 20B:
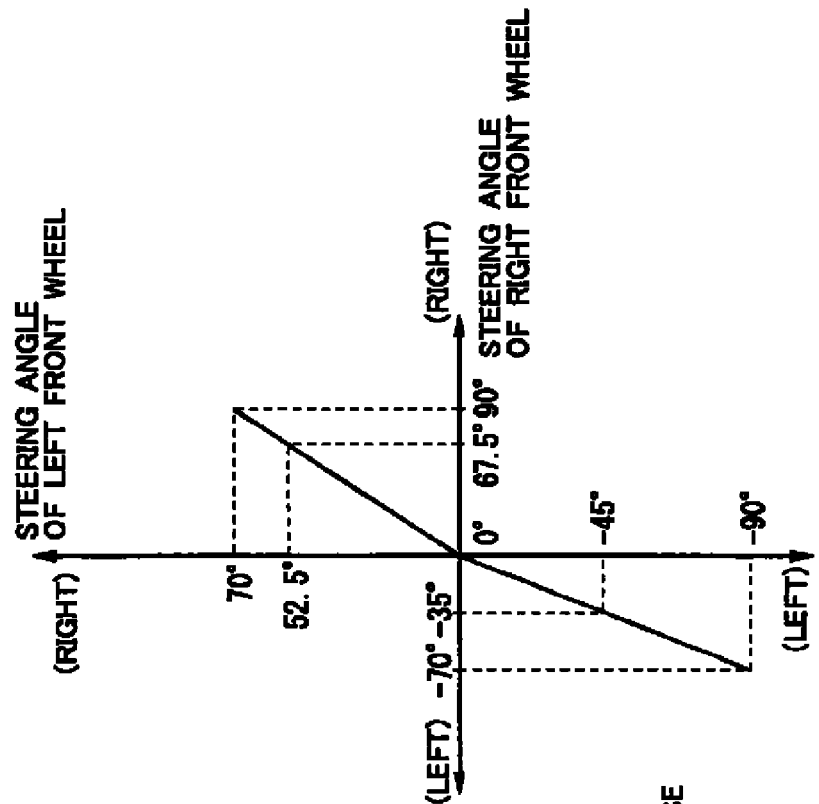
FIG. 20 is a figure showing the relationship of a movement of the left front wheel and of a right front wheel in accordance with an operational state of the steering dial in the elevating work vehicle, with respect to the steering angle of the left front wheel and right front wheel.
Figure 20A:
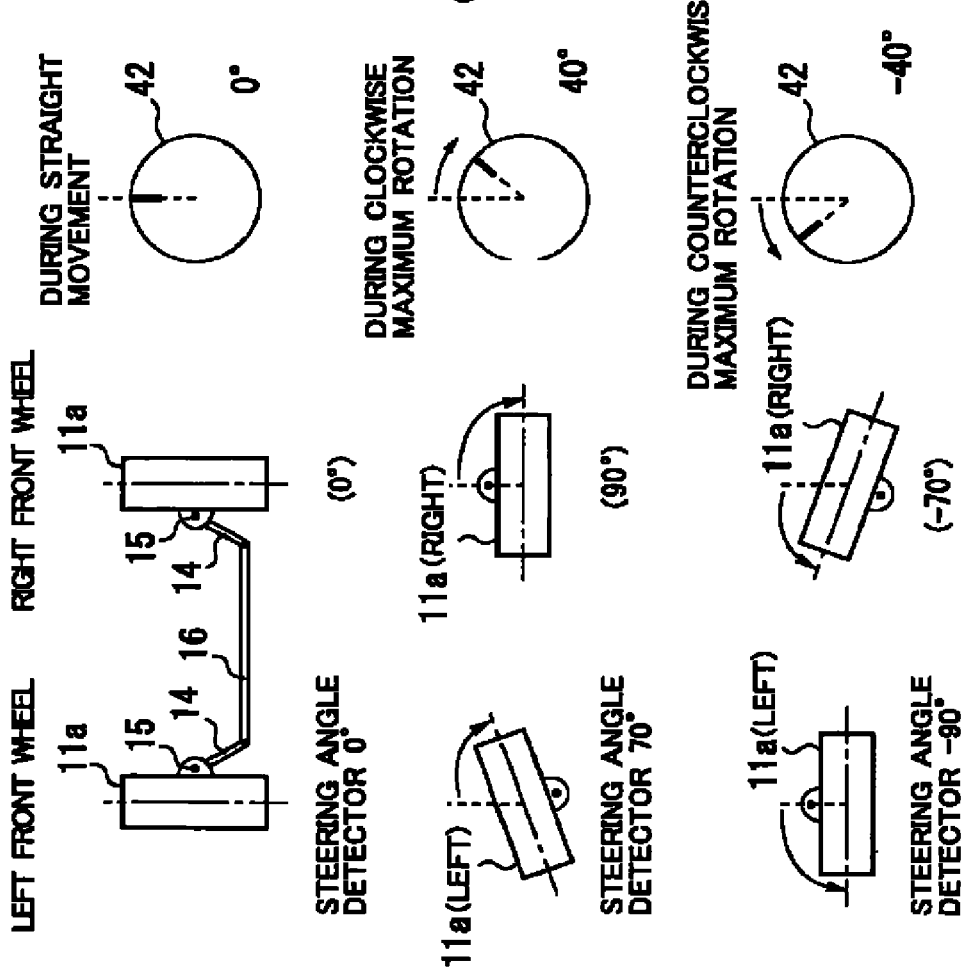

Specifically, in the case in which the steering dial 42 is operated clockwise by the maximum twisted amount (40 degrees), the vehicle 10 is rotated the most significantly to the right, and a steering angle of 70 degrees clockwise is detected as the steering angle of the left front wheel 11L by the steering angle detector 62, it is clear that the steering angle of the right front wheel 11R is 90 degree clockwise, according to the relationship between the steering mechanism 13 and the right front wheel 11R (see FIG. 20). Further, in the case in which the steering dial 42 is operated clockwise by the maximum twisted amount (40 degrees), the vehicle 10 is rotated the most significantly to the left, and a steering angle of 90 degrees counterclockwise is detected as the steering angle of the left front wheel 11L by the steering angle detector 62, it is clear that the steering angle of the right front wheel 11R is 70 degree clockwise, according to the relationship between the steering mechanism 13 and the right front wheel 11R.

According to such configuration, for example, while the vehicle 10 is moving straight (at this moment the steering dial 42 is in the neutral position thereof and the target steering angle and the actual steering angle are both 0 degree), when the steering dial 42 is twisted 20 degrees counterclockwise, the control 50 sets the target steering angle to 45 degrees counterclockwise, and stretches the steering cylinder 17 until the steering angle of the front left front wheel 11a, which is detected by the steering angle detector 62, is conformed with the target steering angle (45 degrees counterclockwise) (see FIG. 19). It should be noted that the steering angle of the right front wheel 11a at this moment is 35 degrees counterclockwise (see FIG. 20).

Further, when the steering dial 42 is twisted 30 degrees clockwise, the controller 50 sets the target steering angle to 52.5 degrees clockwise on the basis of the characteristics of the steering mechanism 13, and stretches the steering cylinder 17 until the steering angle of the left front wheel 11a, which is detected by the steering angle detector 62, is conformed with the target steering angle (52.5 degrees clockwise). It should be noted that the steering angle of the right front wheel 11a at this moment is 67.5 degrees clockwise (see FIG. 20).

According to the above configuration, in the present invention the steering angle of only one of the pair of right and left steering wheels (front wheels 11a) is detected, and the actuation of the steering cylinder is controlled so that the value of the detected steering angle is conformed with the target steering angle which is set in accordance with an operational state of the steering dial (an operation direction and operation amount), whereby the front wheels 11a can be rotated in a desired direction. In this manner, the steering apparatus can be configured and controlled simply.

The above has described the preferred embodiments of the present invention, but the scope of the present invention is not limited to the above embodiments. For example, in the above embodiments, the steering operation means for performing a steering operation on the steering wheels (front wheels 11a) of the vehicle is a dial (steering dial 42), but other means such as a lever may be used. Further, the steering actuator for driving the link mechanism (steering link mechanism 13) linked to the steering wheels (front wheels 11a) of the vehicle may not necessarily be the hydraulic cylinder, thus a hydraulic motor, or a combination of an electric motor and a rack and pinion mechanism may be possible. Moreover, in the above embodiments, mechanical force of one drive motor 12 was transmitted to the right and left rear wheels 11b, which are drive wheels, via the gear box 18 and the right and left axle shafts 19, that is, the right and left rear wheels 11b are simultaneously driven by one drive motor 12, but two drive motors may be provided on the vehicle 10 so that the right and left rear wheels 11b are driven individually by these two drive motors. Furthermore, in the above embodiments, a target work vehicle to which the present invention is applied is an elevating work vehicle comprising a work table, which is elevated and moved freely, at the vehicle, but this is merely an example, thus it is possible to used an elevating work vehicle which comprises a work table at a leading end section of a boom or the like provided at the vehicle. In addition, the work vehicle may not always be the elevating work vehicle as long as it comprises a work apparatus at the wheel-driven vehicle. However, when the present invention is applied to the elevating work vehicle, it is possible to obtain the effects of preventing unsafe situations where the operator loses his balance on the work table.

What is claimed is:

1. A travel control apparatus for a wheel-driven vehicle, comprising:
    a steering operation device configured to receive steering input to steer a wheel to be steered of the vehicle;
    a steering angle detector configured to detect a steering angle of the wheel, the steering angle being a direction and steered angle of the wheel to be steered;
    a steering actuator configured to change the steering angle of the wheel;
    a steering controller configured to control the steering actuator so that the steering angle of the wheel detected by the steering angle detector becomes a target steering angle of the wheel which is set in response to an operation command outputted from the steering operation device, and
    a traveling speed regulator configured to regulate the traveling speed of the vehicle in accordance with an operational state of the steering operation device and an actuation state of the steering actuator,
    wherein the steering control controller is configured to actuate the steering actuator at a first actuation speed if the size of the steering angle, which is obtained on the basis of detection information from the steering angle detector, is a predefined reference amount or lower, and to actuate the steering actuator at a second actuation speed, which is lower than the first actuation speed, for the same operation command when the size of the steering angle exceeds the reference amount, and
    wherein the steering control controller is configured to actuate the steering actuator such that the larger the detected steering angle with respect to a straight forward direction of the wheel, the slower the actuation speed of the steering actuator actuated by the steering controller.

2. The travel control apparatus for a vehicle according to claim 1, wherein the traveling speed regulator is configured to compare the target steering angle of the wheel, which is set in accordance with an operational state of the steering operation device, with the detected steering angle of the wheel, which is detected by the steering angle detector, and, when difference between the target steering angle and the detected steering angle is a predetermined value or higher, to regulate the traveling speed of the vehicle to a predetermined speed or lower.

3. The travel control apparatus for a vehicle according to claim 1, wherein the traveling speed regulator is configured to control and compare the target steering angle of the wheel, which is set in accordance with an operational state of the steering operation device, with the detected steering angle of the wheel, which is detected by the steering angle detector, and to gradually reduce the traveling speed of the vehicle as the difference between the target steering angle and the detected steering angle increases.

4. The travel control apparatus for a vehicle according to claim 3, wherein the traveling speed regulator is configured to set a deceleration which increases as the difference increases, and to perform a control to gradually reduce the traveling speed of the vehicle on the basis of the set deceleration.

5. The travel control apparatus for a vehicle according to claim 1, further comprising:
   a steering operation speed detector configured to obtain an operation speed of the steering operation device,
   wherein, when the operation speed of the steering operation device, which is obtained by the steering operation speed detector, is a predetermined value or higher, the traveling speed regulator regulates the traveling speed of the vehicle so that the traveling speed of the vehicle becomes a predetermined speed or lower.

6. The travel control apparatus for a vehicle according to claim 1, further comprising:
   a steering operation speed detector configured to obtain an operation speed of the steering operation device,
   wherein, when the operation speed of the steering operation device, which is obtained by the steering operation speed detector, is a predetermined value or higher, the traveling speed regulator is configured gradually to reduce the traveling speed of the vehicle as the operation speed increases.

7. The travel control apparatus for a vehicle according to claim 6, wherein the traveling speed regulator is configured to set a deceleration which increases as the operation speed increases, and to perform a control to gradually reduce the traveling speed of the vehicle on the basis of the set deceleration.

8. The travel control apparatus for a vehicle according to claim 1, further comprising:
   a steering actuator actuation speed detector configured to obtain an actuation speed of the steering actuator,
   wherein, when the actuation speed of the steering actuator, which is obtained by the steering actuator actuation speed detector, is a predetermined value or higher, the traveling speed regulator is configured to regulate the traveling speed of the vehicle so that the traveling speed of the vehicle becomes a predetermined speed or lower.

9. The travel control apparatus for a vehicle according to claim 1, further comprising:
   a steering actuator actuation speed detector configure to obtain an actuation speed of the steering actuator,
   wherein, when the actuation speed of the steering actuator, which is obtained by the steering actuator actuation speed detector, is a predetermined value or higher, the traveling speed regulator is configured to perform a control to gradually reduce the traveling speed of the vehicle as the actuation speed increases.

10. The travel control apparatus for a vehicle according to claim 9, wherein the traveling speed regulator is configured to set a deceleration which increases as the actuation speed increases, and to perform a control to gradually reduce the traveling speed of the vehicle on the basis of the set deceleration.

11. The travel control apparatus for a vehicle according to claim 1, wherein the steering controller is configured to actuate the steering actuator at the first actuation speed when the target steering angle is set so that the size of the steering angle becomes the reference amount or lower from the state in which the size of the steering angle exceeds the reference amount, even if the size of the steering angle still exceeds the reference amount.

12. The travel control apparatus for a vehicle according to claim 1, wherein the larger the steering angle with respect to a straight forward direction of the wheel, the steering angle being detected by the steering angle detector, the slower the actuation speed of the steering actuator actuated by the steering controller.

13. The travel control apparatus for a vehicle according to claim 1, further comprising:
   a steering mechanism having a pair of knuckle arms swingably supporting a pair of the wheels to be steered around kingpin axes, and a tie rod connecting the pair of knuckle arms,
   wherein the steering actuator is configured to drive the steering mechanism to change the steering angles of the wheels,
   the steering angle detector being attached to one of the pair of right and left wheels, and
   the steering controller is configured to control the actuation of the steering actuator so that one of the steering angles of the pair of right and left wheels detected by the steering angle detector becomes the target steering angle which is set in response to an operation command outputted from the steering operation device.

14. The travel control apparatus for a vehicle according to claim 13, wherein
   the steering mechanism is characterized in that a difference is generated between the steering angles of the pair of right and left wheels when the vehicle turns, and
   the target steering angle is set for one of the pair of right and left wheels to which the steering angle detector is attached, in accordance with an operation direction and the amount of operation of the steering operation device, and
   the steering controller is configured to perform a control to actuate the steering actuator on the basis of the characteristic of the steering mechanism so that the steering angle of one of the pair of right and left wheels, which is detected by the steering angle detector, becomes the target steering angle which is set in accordance with the operation direction and the amount of operation of the steering operation device.

* * * * *